US011495184B2

(12) United States Patent
Chen et al.

(10) Patent No.: US 11,495,184 B2
(45) Date of Patent: Nov. 8, 2022

(54) CONTROL METHOD OF ELECTRONIC INK SCREEN, DISPLAY CONTROL DEVICE AND ELECTRONIC INK DISPLAY APPARATUS

(71) Applicants: Chongqing BOE Smart Electronics System Co.,Ltd., Chongqing (CN); BOE TECHNOLOGY GROUP CO., LTD., Beijing (CN)

(72) Inventors: Lichun Chen, Beijing (CN); Lianghui Shi, Beijing (CN); Heng Zheng, Beijing (CN)

(73) Assignees: Chongqing BOE Smart Electronics System Co., Ltd., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/427,610

(22) PCT Filed: Sep. 29, 2020

(86) PCT No.: PCT/CN2020/118990
§ 371 (c)(1),
(2) Date: Jul. 30, 2021

(87) PCT Pub. No.: WO2022/067550
PCT Pub. Date: Apr. 7, 2022

(65) Prior Publication Data
US 2022/0165222 A1 May 26, 2022

(51) Int. Cl.
G09G 3/34 (2006.01)
G09G 3/20 (2006.01)
(Continued)

(52) U.S. Cl.
CPC ............ *G09G 3/344* (2013.01); *G02F 1/167* (2013.01); *G09G 3/2003* (2013.01);
(Continued)

(58) Field of Classification Search
None
See application file for complete search history.

(56) References Cited

U.S. PATENT DOCUMENTS 8,243,013 B1\* 8/2012 Sprague ................. G09G 3/344
345/76
8,803,793 B2 8/2014 Lim et al.
(Continued)

FOREIGN PATENT DOCUMENTS

| CN | 106909011 A | 6/2017 |
| CN | 108461066 A | 8/2018 |
| CN | 111508442 A | 8/2020 |

*Primary Examiner* — Patrick N Edouard
*Assistant Examiner* — Peijie Shen
(74) *Attorney, Agent, or Firm* — IP & T Group LLP

(57) ABSTRACT

A control method of an electronic ink screen includes: outputting a first color driving signal to pixel(s) expected to display a first color in the electronic ink screen. The first color driving signal includes a first dither signal and a first color first pull-up signal in adjacent periods. The first dither signal includes a first rectangular wave signal, a first electric field cancellation signal and a first constant voltage signal. The first constant voltage signal is configured to drive first color charged particles in the pixel(s) expected to display the first color to move toward a side proximate to a display surface of the electronic ink screen, and the first color first pull-up signal is configured to drive the first color charged particles in the pixel(s) expected to display the first color to move toward the side proximate to the display surface of the electronic ink screen.

19 Claims, 9 Drawing Sheets

(51) Int. Cl.
    *G02F 1/167*     (2019.01)
    *G02F 1/1675*     (2019.01)

(52) U.S. Cl.
    CPC ............... *G02F 2001/1678* (2013.01); *G09G 2310/065* (2013.01); *G09G 2310/068* (2013.01)

(56) References Cited

U.S. PATENT DOCUMENTS

| | | | | |
|---|---|---|---|---|
| 10,395,406 B2* | 8/2019 | Mitsugi | .................... | G04G 9/00 |
| 2004/0150325 A1* | 8/2004 | Yamakita | .............. | G02F 1/1671 |
| | | | | 313/500 |
| 2005/0179641 A1* | 8/2005 | Zhou | ...................... | G09G 3/344 |
| | | | | 345/107 |
| 2006/0132426 A1* | 6/2006 | Johnson | ................... | G09G 3/34 |
| | | | | 345/107 |
| 2006/0244714 A1* | 11/2006 | Zhou | ...................... | G09G 3/344 |
| | | | | 345/107 |
| 2006/0262083 A1* | 11/2006 | Zhou | ...................... | G09G 3/344 |
| | | | | 345/107 |
| 2008/0150928 A1* | 6/2008 | Van Der Hoef | ....... | G09G 3/344 |
| | | | | 345/210 |
| 2008/0309657 A1* | 12/2008 | Rhodes | .................. | G09G 3/344 |
| | | | | 345/214 |
| 2011/0193841 A1* | 8/2011 | Amundson | .......... | G02F 1/13306 |
| | | | | 345/208 |
| 2011/0254826 A1* | 10/2011 | Umezaki | ................ | G09G 3/344 |
| | | | | 345/212 |
| 2014/0092466 A1* | 4/2014 | Wang | ....................... | G09G 3/34 |
| | | | | 359/296 |
| 2014/0340735 A1* | 11/2014 | Lin | .......................... | G02F 1/167 |
| | | | | 359/296 |
| 2016/0041448 A1* | 2/2016 | Lin | .......................... | G02F 1/167 |
| | | | | 359/296 |
| 2016/0085132 A1* | 3/2016 | Telfer | ...................... | G02F 1/167 |
| | | | | 359/296 |
| 2016/0162242 A1* | 6/2016 | Xiong | ..................... | G06F 3/147 |
| | | | | 345/5 |
| 2016/0351131 A1* | 12/2016 | Crounse | ................. | G09G 3/344 |
| 2017/0025072 A1* | 1/2017 | Lin | ....................... | G09G 3/2003 |
| 2017/0263175 A1* | 9/2017 | Crounse | ................. | G09G 3/344 |
| 2017/0287377 A1* | 10/2017 | Telfer | ...................... | G09G 3/344 |
| 2018/0053472 A1* | 2/2018 | Lin | ......................... | G02F 1/1685 |
| 2018/0152823 A1* | 5/2018 | Kovács | ............... | H04N 1/00127 |
| 2018/0329268 A1 | 11/2018 | Li et al. | | |
| 2019/0212626 A1* | 7/2019 | Chiu | ..................... | G02F 1/1685 |
| 2019/0213959 A1* | 7/2019 | Lin | .......................... | G02F 1/167 |
| 2019/0228716 A1* | 7/2019 | Fang | ..................... | G09G 3/344 |
| 2019/0333454 A1* | 10/2019 | Lin | ....................... | G09G 3/2003 |
| 2020/0026143 A1* | 1/2020 | Lin | ......................... | G09G 3/344 |
| 2021/0142740 A1* | 5/2021 | Gao | ........................ | G02F 1/1685 |
| 2021/0382369 A1* | 12/2021 | Zheng | ................... | G09G 3/344 |

* cited by examiner

CONTROL METHOD OF ELECTRONIC INK SCREEN, DISPLAY CONTROL DEVICE AND ELECTRONIC INK DISPLAY APPARATUS

CROSS-REFERENCE TO RELATED APPLICATION

This application is a national phase entry under 35 USC 371 of International Patent Application No. PCT/CN2020/118990 filed on Sep. 29, 2020, which is incorporated herein by reference in its entirety.

TECHNICAL FIELD

The present disclosure relates to the field of display technologies, and in particular, to a control method of an electronic ink screen, a display control device and an electronic ink display apparatus.

BACKGROUND

Like traditional ink, electronic ink can be printed onto surfaces of many materials (e.g., plastic, polyester film, paper, cloth, etc.). The difference is that electronic ink can change color due to action of an electric field. Therefore, electronic ink display apparatuses made of electronic ink can display images.

Compared with other types of displays, such as liquid crystal displays (LCDs) and organic electroluminescence displays (OLEDs), electronic ink display apparatuses have the advantages of low power consumption, legibility, and low manufacturing cost.

SUMMARY

In one aspect, a control method of an electronic ink screen is provided. The electronic ink screen includes a plurality of pixels. At least one pixel includes first color charged particles. The control method of the electronic ink screen includes: outputting a first color driving signal to at least one pixel expected to display a first color in the electronic ink screen. The first color driving signal includes sub-signals in a plurality of periods; the sub-signals in the plurality of periods include a first dither signal and a first color first pull-up signal in adjacent periods, and the first color first pull-up signal is in a period immediately after a period corresponding to the first dither signal. The first dither signal includes a first rectangular wave signal, a first electric field cancellation signal and a first constant voltage signal that are output in sequence. The first constant voltage signal is configured to drive the first color charged particles in the pixel expected to display the first color to move toward a side proximate to a display surface of the electronic ink screen, and the first color first pull-up signal is configured to drive the first color charged particles in the pixel expected to display the first color to move toward the side proximate to the display surface of the electronic ink screen.

In some embodiments, the first rectangular wave signal includes a first level signal and a second level signal that are alternately output. A voltage value of the first constant voltage signal is substantially equal to one of a voltage value of the first level signal and a voltage of the second level signal, or, a voltage value of the first constant voltage signal is between a voltage value of the first level signal and a voltage value of the second level signal.

In some embodiments, the first color first pull-up signal includes a second constant voltage signal. A voltage value of the second constant voltage signal is between the voltage value of the first level signal and the voltage value of the second level signal. The voltage value of the first constant voltage signal is between the voltage value of the first level signal and the voltage value of the second level signal, the voltage value of the first constant voltage signal is equal to the voltage value of the second constant voltage signal.

In some embodiments, the sub-signals in the plurality of periods included in the first color driving signal include sub-signals in seven periods. The sub-signals in a first period to a seventh period included in the first color driving signal sequentially are: a second electric field cancellation signal; a first color pull-down signal configured to drive the first color charged particles in the pixel expected to display the first color to move toward a side away from the display surface of the electronic ink screen; a second dither signal including a second rectangular wave signal having a second frequency; the first dither signal, the first rectangular wave signal having a first frequency; the first color first in pull-up signal; a third electric field cancellation signal; and a first color second pull-up signal configured to drive the first color charged particles in the pixel expected to display the first color to move toward the side proximate to the display surface of the electronic ink screen. The first frequency is greater than the second frequency.

In some embodiments, the at least one pixel further includes second color charged particles and third color charged particles. The first color charged particles and the second color charged particles have like charges. The first color charged particles and the third color charged particles have opposite charges. A mass of the first color charged particles is greater than a mass of the second color charged particles.

In some embodiments, the control method of the electronic ink screen further includes: outputting a second color driving signal to at least one pixel expected to display a second color in the electronic ink screen. The second color driving signal includes sub-signals in a plurality of periods. A sub-signal in the second color driving signal in a same period as the first dither signal is a third dither signal, and the third dither signal includes a third rectangular wave signal and a fourth electric field cancellation signal that are output in sequence.

In some embodiments, the sub-signals in the plurality of periods included in the second color driving signal include sub-signals in seven periods. The subub-signals in a first period to a seventh period included in the second color driving signal sequentially are: a second color pull-down signal configured to drive the second color charged particles in the pixel expected to display the second color to move toward a side away from the display surface of the electronic ink screen; a fourth dither signal including a fourth rectangular wave signal; a fifth dither signal including a fifth rectangular wave signal having a fifth frequency; the third dither signal, the third rectangular wave signal having a third frequency; a fifth electric field cancellation signal; a second color pull-up signal in configured to drive the second color charged particles in the pixel expected to display the second color to move toward the side proximate to the display surface of the electronic ink screen; and a sixth electric field cancellation signal. The third frequency is greater than the fifth frequency.

In some embodiments, the sub-signals in the plurality of periods included in the first color driving signal includes sub-signals in seven periods. The sub-signals in a first period to a seventh period included in the first color driving signal sequentially are: a second electric field cancellation signal;

a first color pull-down signal configured to drive the first color charged particles in the pixel expected to display the first color to move toward a side away from the display surface of the electronic ink screen; a second dither signal including a second rectangular wave signal having a second frequency; the first dither signal, the first rectangular wave signal having a first frequency; the first color first pull-up signal; a third electric field cancellation signal; and a first color second pull-up signal configured to drive the first color charged particles in the pixel expected to display the first color to move toward the side proximate to the display surface of the electronic ink screen. The third frequency is equal to the first frequency, and the fifth frequency is equal to the second frequency.

In some embodiments, the control method of the electronic ink screen further includes: outputting a third color driving signal to at least one pixel expected to display a third color in the electronic ink screen. The third color driving signal includes sub-signals in a plurality of periods. A sub-signal in the third color driving signal in a same period as the first dither signal is a sixth dither signal, and the sixth dither signal includes a sixth rectangular wave signal and a seventh electric field cancellation signal that are output in sequence.

In some embodiments, the sub-signals in the plurality of periods included in the third color driving signal include sub-signals in seven periods. The sub-signals in a first period to a seventh period included in the third color driving signal sequentially are: a third color pull-down signal configured to drive the third color charged particles in the pixel expected to display the third color to move toward a side away from the display surface of the electronic ink screen; a seventh dither signal including a seventh rectangular wave signal; an eighth dither signal including an eighth rectangular wave signal having an eighth frequency; the sixth dither signal, the sixth rectangular wave signal having a sixth frequency; an eighth electric field cancellation signal; a third color pull-up signal configured to drive the third color charged particles in the pixel expected to display the third color to move toward the side proximate to the display surface of the electronic ink screen; and a ninth electric field cancellation signal. The sixth frequency is greater than the eighth frequency.

In some embodiments, the sub-signals in the plurality of periods included in the first color driving signal includes sub-signals in seven periods. The sub-signals in a first period to a seventh period included in the first color driving signal sequentially are: a second electric field cancellation signal; a first color pull-down signal configured to drive the first color charged particles in the pixel expected to display the first color to move toward a side away from the display surface of the electronic ink screen; a second dither signal including a second rectangular wave signal having a second frequency; the first dither signal, the first rectangular wave signal having a first frequency; the first color first pull-up signal; a third electric field cancellation signal; and a first color second pull-up signal configured to drive the first color charged particles in the pixel expected to display the first color to move toward the side proximate to the display surface of the electronic ink screen. The sixth frequency is equal to the first frequency, and the eighth frequency is equal to the second frequency.

In some embodiments, colors in an image to be displayed include a second color, a third color and the first color, and the control method of the electronic ink screen further includes: outputting a second color driving signal to at least one pixel expected to display the second color in the electronic ink screen; and outputting a third color driving signal to at least one pixel expected to display the third color in the electronic ink screen. Outputting the second driving signal to the pixel expected to display the second color in the electronic ink screen, outputting the third driving signal to the pixel expected to display the third color in the electronic ink screen, and outputting the first driving signal to the pixel expected to display the first color in the electronic ink screen, includes: sequentially scanning each row of pixels in the electronic ink screen in an I-th display driving period of displaying the image to be displayed; outputting a sub-signal in the I-th period of the second color driving signal to the pixel expected to display the second color in each row of pixels scanned, outputting a sub-signal in the I-th period of the third color driving signal to the pixel expected to display the third color in each row of pixels scanned, and outputting a sub-signal in the I-th period of the first color driving signal to the pixel expected to display the first color in each row of pixels scanned. I is greater than or equal to 1 (I≥1), and the second color driving signal, the third color driving signal and the first color driving signal include a same number of periods.

In some embodiments, each pixel includes second color charged particles, third color charged particles, and the first color charged particles, and the control method of the electronic ink screen further includes: outputting a second color driving signal to at least one pixel expected to display a second color in the electronic ink screen; and outputting a third color driving signal to at least one pixel expected to display a third color in the electronic ink screen. Outputting the second color driving signal to the pixel expected to display the second color in the electronic ink screen, outputting the third color driving signal to the pixel expected to display the third color in the electronic ink screen, and outputting the first color driving signal to the pixel expected to display the first color in the electronic ink screen, includes: outputting the second color driving signal corresponding to a second color waveform file to the pixel expected to display the second color according to the stored second color waveform file; outputting the third color driving signal corresponding to a third color waveform file to the pixel expected to display the third color according to the stored third color waveform file; and outputting the first color driving signal corresponding to a first color waveform file to the pixel expected to display the first color according to the stored second color waveform file.

In another aspect, a display control device is provided. The display control device includes a source driver and at least one processor. The at least one processor is configured to control the source driver to output a first color driving signal to at least one pixel expected to display a first color in an electronic ink screen. The first color driving signal includes sub-signals in a plurality of periods; the sub-signals in the plurality of periods include a first dither signal and a first color first pull-up signal in adjacent periods, and the first color first pull-up signal is in a period immediately after a period corresponding to the first dither signal. The first dither signal includes: a first rectangular wave signal, a first electric field cancellation signal and a first constant voltage signal that are output in sequence. The first constant voltage signal is configured to drive first color charged particles in the pixel expected to display the first color to move toward a side proximate to a display surface of the electronic ink screen, and the first color first pull-up signal is configured to drive the first color charged particles in the pixel expected to display the first color to move toward the side proximate to the display surface of the electronic ink screen.

In some embodiments, the at least one processor is further configured to control the source driver to output a second color driving signal to at least one pixel expected to display a second color in the electronic ink screen. The second color driving signal includes sub-signals in a plurality of periods. A sub-signal in the second color driving signal in a same period as the first dither signal is a third dither signal. The third dither signal includes a third rectangular wave signal and a fourth electric field cancellation signal that are output in sequence.

In some embodiments, the at least one processor is further configured to control the source driver to output a third color driving signal to at least one pixel expected to display a third color in the electronic ink screen. The third color driving signal includes sub-signals in a plurality of periods. A sub-signal in the third color driving signal in a same period as the first dither signal is a sixth dither signal. The sixth dither signal includes a sixth rectangular wave signal and a seventh electric field cancellation signal that are output in sequence.

In some embodiments, the display control device further includes a gate driver. The at least one processor is configured to control the gate driver to sequentially scan each row of pixels in the electronic ink screen in an I-th display driving period of displaying an image to be displayed, and control the source driver to output a sub-signal in the I-th period of the second color driving signal to the pixel expected to display the second color in each row of pixels scanned, output a sub-signal in the I-th period of the third color driving signal to the pixel expected to display the third color in each row of pixels scanned, and output a sub-signal in the I-th period of the first color driving signal to the pixel expected to display the first color in each row of pixels scanned. I is greater than or equal to 1 (I≥1), and the second color driving signal, the third color driving signal and the first color driving signal include a same number of periods.

In some embodiments, the display control device further includes at least one memory. The at least one memory is configured to store a second color waveform file, a third color waveform file, and a first color waveform file. The at least one processor is further configured to output a second color driving signal corresponding to the second color waveform file to at least one pixel expected to display a second color according to the stored second color waveform file, output a third color driving signal corresponding to the third waveform file to at least one pixel expected to display a third color according to the stored third color waveform file, and output the first color driving signal corresponding to the first waveform file to the pixel expected to display the first color according to the stored first color waveform file.

In yet another aspect, an electronic ink display apparatus is provided. The electronic ink display apparatus includes an electronic ink screen and the display control device described in any of the above embodiments.

In yet another aspect, a non-transitory computer-readable storage medium is provided. The non-transitory computer-readable storage medium has stored thereon computer program instructions that, when executed on an electronic ink display apparatus, cause the electronic ink display apparatus to perform the control method of the electronic ink screen described in any of the above embodiments.

In yet another aspect, a non-transitory computer-readable storage medium is provided. The non-transitory computer-readable storage medium has stored thereon computer program instructions that, when executed on a processor, cause the processor to perform one or more steps in the control method of the electronic ink screen described in any of the above embodiments.

In yet another aspect, a computer program product is provided. The computer program product includes computer program instructions that, when executed on a computer, cause the computer (e.g., an electronic ink display apparatus) to perform one or more steps in the control method of the electronic ink screen described in any of the above embodiments.

In yet another aspect, a computer program is provided. When t executed on a computer, the computer program causes the computer (e.g., an electronic ink display apparatus) to perform one or more steps in the control method of the electronic ink screen described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
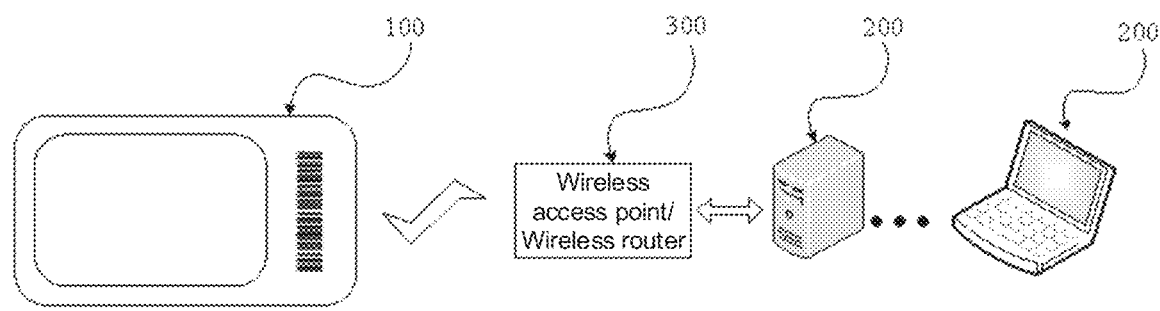
FIG. 1 is a diagram showing a structure of a system architecture adopting an electronic ink display apparatus, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" or "the plurality of" means two or more unless otherwise specified.

The use of the phrase "applicable to" or "configured to" means an open and inclusive expression, which does not exclude devices that are applicable to or configured to perform additional tasks or steps.

In addition, the use of "based on" means openness and inclusiveness, because processes, steps, calculations or other actions "based on" one or more of the stated conditions or values may be based on additional conditions or exceed the stated values in practice.

The term "approximately" as used herein includes a stated value and an average value within an acceptable range of deviation of a particular value, the acceptable range of deviation being determined by a person of ordinary skill in the art, in consideration of the measurement in question and errors associated with measurement of a particular quantity (i.e., limitations of a measurement system).

Exemplary embodiments are described herein with reference to sectional views and/or plan views as idealized exemplary drawings. In the accompanying drawings, thickness of layers and sizes of regions are exaggerated for clarity. Therefore, variations in shapes with respect to the accompanying drawings due to, for example, manufacturing technology and/or tolerances may be envisaged. Therefore, the exemplary embodiments should not be construed as being limited to the shapes of the regions shown herein, but include deviations in the shapes caused by, for example, manufacturing. For example, an etched region shown as a rectangle generally has a feature of being curved. Therefore, the regions shown in the accompanying drawings are schematic in nature, and their shapes are not intended to show actual shapes of the regions in a device, and are not intended to limit the scope of the exemplary embodiments.

In order to meet the user's demand for image quality when refreshing the image, an afterimage test is generally performed on the display apparatus before the product leaves the factory. When switching images on a display apparatus, a previous image may not disappear immediately and may appear simultaneously with a next image in the visual effect, which is called the afterimage phenomenon. In a process of displaying the next image, a remaining image of the previous image is called an afterimage. The afterimage test is to test a degree to which the previous image remains on the screen in a process of displaying the next image when switching between images with different colors.

It is well known that, there are many kinds of display apparatuses, such as liquid crystal display apparatuses and electronic ink display apparatuses. Electronic ink display apparatuses are widely favored by consumers due to their many advantages. In an example where the electronic ink display apparatus is capable of displaying black, white and red images, if there is an need to test afterimage in the red image, a black image can be switched to a red image to test the degree to which the black image remains on the screen when the red image is displayed; and a white image can be switched to a red image to test the degree to which the white image remains on the screen when the red image is displayed. The inventor has found that, in the related art, the afterimage problem is very serious in the red image of the electronic ink display apparatus, which affects the display quality of the product.

In order to solve this problem, referring to FIG. 1, some embodiments of the present disclosure provide a system architecture adopting an electronic ink display apparatus, which includes: an electronic ink display apparatus 100 and a communication opposite-end device 200 that communicate with each other. The communication opposite-end device 200 is configured to control an image (i.e., a picture) displayed on the electronic ink display apparatus 100. In some embodiments, the electronic ink display apparatus 100 is connected with the communication opposite-end device 200 through wireless communication (e.g., Wi-Fi, Bluetooth, etc.). For example, the system architecture further includes a wireless router or a wireless access point (AP) 300. The communication opposite-end device 200 is connected with the wireless router or wireless AP 300 through wireless communication or wired communication. The electronic ink display apparatus 100 is connected with the wireless router or wireless AP 300 through wireless communication, so as to be in communication connection with the communication opposite-end device 200. Certainly, this embodiment is not limited to this communication connection method. For example, the communication opposite-end device 200 and the electronic ink display apparatus 100 may be connected through wired communication.

The electronic ink display apparatus 100 can be applied to various scenarios. For example, the electronic ink display apparatus 100 may be an electronic reader, a smart tag (also called an electronic tag), an electronic timepiece (e.g., an electronic watch), a thermometer, a bus stop sign, a gasoline price tag at a gasoline station, etc. The smart tag may include an electronic price tag that can be placed on a shelf in a supermarket, a convenience store, a pharmacy and the like, or a luggage tag, a drug tag on drug packaging, etc.

Figure 2:
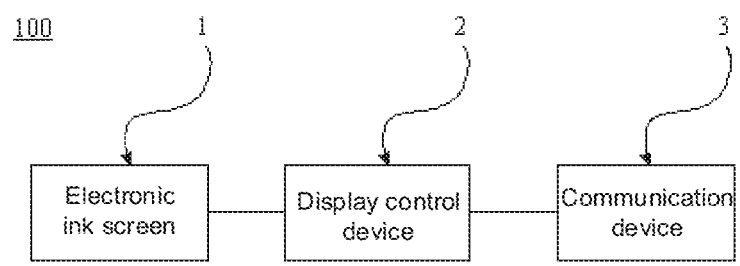
FIG. 2 is a diagram showing a structure of an electronic ink display apparatus, in accordance with some embodiments of the present disclosure.

Referring to FIG. 2, the electronic ink display apparatus 100 includes an electronic ink screen 1, a display control device 2 and a communication device 3. The electronic ink screen 1 and the communication device 3 are both connected to the display control device 2.

Figure 3:
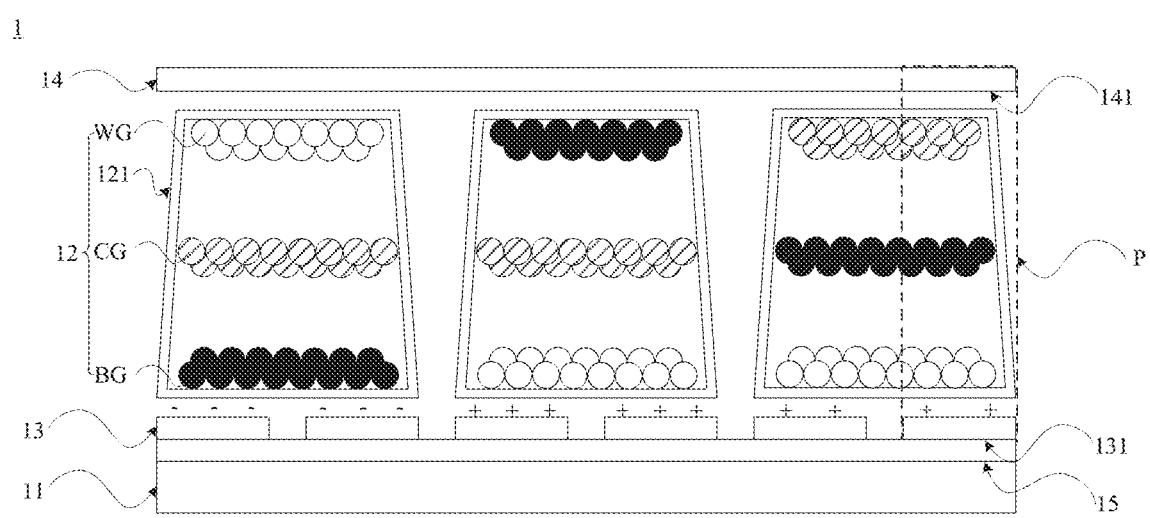
FIG. 3 is a diagram showing a structure of an electronic ink screen, in accordance with some embodiments of the present disclosure.

Referring to FIG. 3, in some embodiments, the electronic ink screen 1 includes a substrate 11, an electronic ink film 12 disposed above the substrate 11, a first electrode layer 13 and a second electrode layer 14. In a thickness direction of the substrate 11, the first electrode layer 13 and the second electrode layer 14 are disposed at two sides of the electronic ink film, and the first electrode layer 13 is closer to the substrate 11 than the second electrode layer 14. Generally, the second electrode layer 14 is closer to a display surface of the electronic ink screen 1 than the first electrode layer 13. The electronic ink film 12 includes a plurality of microstructures 121, such as microcups or microcapsules. Each microstructure 121 includes a transparent liquid and various types of charged particles. By supplying power to the first electrode layer 13 and the second electrode layer 14, an electric field formed therebetween can drive the charged particles in each microstructure 121 to move, so as to control the type of charged particles suspended at a position proximate to the display surface (a top position of the microstructure 121 in FIG. 3) in each microstructure 121, and thereby control a color presented by each microstructure 121 and make the electronic ink screen 1 display an image.

Among the various types of charged particles included in the electronic ink film 12, there may be two types of charged particles with different colors and like charges (that is, the electrical property of the charges are the same). One type of charged particles of the two types of charged particles has a larger mass than the other. In this case, the type of charged particles with a larger mass can be defined as first color charged particles, and the type of charged particles with a smaller mass can be defined as second color charged particles. Densities of the first color charged particles and the second color charged particles may be the same or approximately the same, and a volume of the first color charged particles is larger than a volume of the second color charged particles.

In some examples, the various types of charged particles included in the electronic ink film 12 include: first color charged particles, second color charged particles, and third color charged particles. The first color charged particles and the second color charged particles have like charges. The first color charged particles and the third color charged particles have opposite charges. A mass of the first color charged particles is greater than a mass of the second color charged particles. For example, the electronic ink film 12 includes white charged particles WG, black charged particles BG, and chromatic color charged particles CG (e.g., red charged particles). The white charged particles WG may be negatively charged, and the black charged particles BG and the chromatic color charged particles CG may be positively charged. A mass of the chromatic color charged particles CG is greater than a mass of the black charged particles BG. The chromatic color charged particles CG may be defined as the first color charged particles, the black charged particles BG may be defined as the second color charged particles, and the white charged particles WG may be defined as the third color charged particles. For another example, the electronic ink film 12 includes white charged particles WG, black charged particles BG, and chromatic color charged particles CG. The chromatic color charged particles CG may be negatively charged, and one type of charged particles of the white charged particles WG and the black charged particles BG (e.g., the white charged particles WG) may be negatively charged, and the other type of charged particles (e.g., the black charged particles BG) may be positively charged. A mass of the chromatic color charged particle CG is larger than a mass of one type of charged particles (e.g., the white charged particle WG) with like charges. The chromatic color charged particles CG may be defined as the first color charged particles, one type of charged particles having like charges as the chromatic color charged particles CG (the white charged particles WG) may be defined as the second color charged particles, and the black charged particles BG may be defined as the third color charged particles.

In some examples, the various types of charged particles included in the electronic ink film 12 includes two types of charged particles, namely, the first color charged particles and the second color charged particles, which have like charges. A mass of the first color charged particles is greater than a mass of the second color charged particles. For example, the electronic ink film 12 includes two types of charged particles, namely, chromatic color charged particles CG and black charged particles BG. The chromatic color charged particles CG and the black charged particles BG are both positively charged. A mass of the chromatic color charged particles CG is greater than a mass of the black charged particles BG. The chromatic color charged particles CG may be defined as the first color charged particles, and the black charged particles BG may be defined as the second color charged particles.

Referring to FIG. 3, the electronic ink film 12, the first electrode layer 13 and the second electrode layer 14 in the electronic ink screen 1 may constitute a plurality of pixels P. For example, the plurality of pixels P may be arranged in an array. That is, the electronic ink screen includes S rows by Q columns of pixels P, S is greater than or equal to 2 (S≥2), and Q is greater than equal to 2 (Q≥2). Correspondingly, the first electrode layer 13 may include a plurality of first electrodes (also referred to as pixel electrodes) 131 that are spaced apart, and the second electrode layer 14 may include a plurality of second electrodes (also referred to as common electrodes) 141 arranged opposite to the plurality of first electrodes 131. The plurality of second electrodes 141 may be electrically connected to each other. For example, the second electrode layer 14 may be a planar electrode layer, and the planar electrode layer only has a closed contour line. For example, a pixel P may include a first electrode 131 and one or more microstructures 121 (e.g., a single microstructure 121); or, as shown in FIG. 3, a single microstructure 121 may be arranged in two adjacent pixels P.

In this way, the display control device 2 may apply a voltage signal (it may be referred to as a COM signal, and a voltage value thereof may be represented by CM) to the second electrode layer 14, and may apply a corresponding data driving signal to a first electrode 131 included in each pixel P according to pixel data of the pixel P in the process of refreshing the image displayed by the electronic ink screen 1. The data driving signal is a signal that varies within a range defined by a high voltage value (i.e., a voltage value higher than the COM signal, which may be represented by HI) and a low voltage value (i.e., a voltage value lower than the COM signal, which may be represented by LO). For example, if pixel data of a pixel P is first color pixel data, a first color driving signal is applied to a first electrode 131 of the pixel P, so that first color charged particles in the pixel P are suspended at the position proximate to the display surface after the image refresh is complete, and the pixel P displays the first color. If pixel data of a pixel P is second color pixel data, a second color driving signal is applied to a first electrode 131 of the pixel P, so that second color charged particles in the pixel P are suspended at the position proximate to the display surface after the image refresh is complete, and the pixel P displays the second color. If pixel data of a pixel P is third color pixel data, a third color driving signal is applied to the pixel P, so that third color charged particles in the pixel P are suspended at the position proximate to the display surface after the image refresh is complete, and the pixel P displays the third color.

Figure 4:
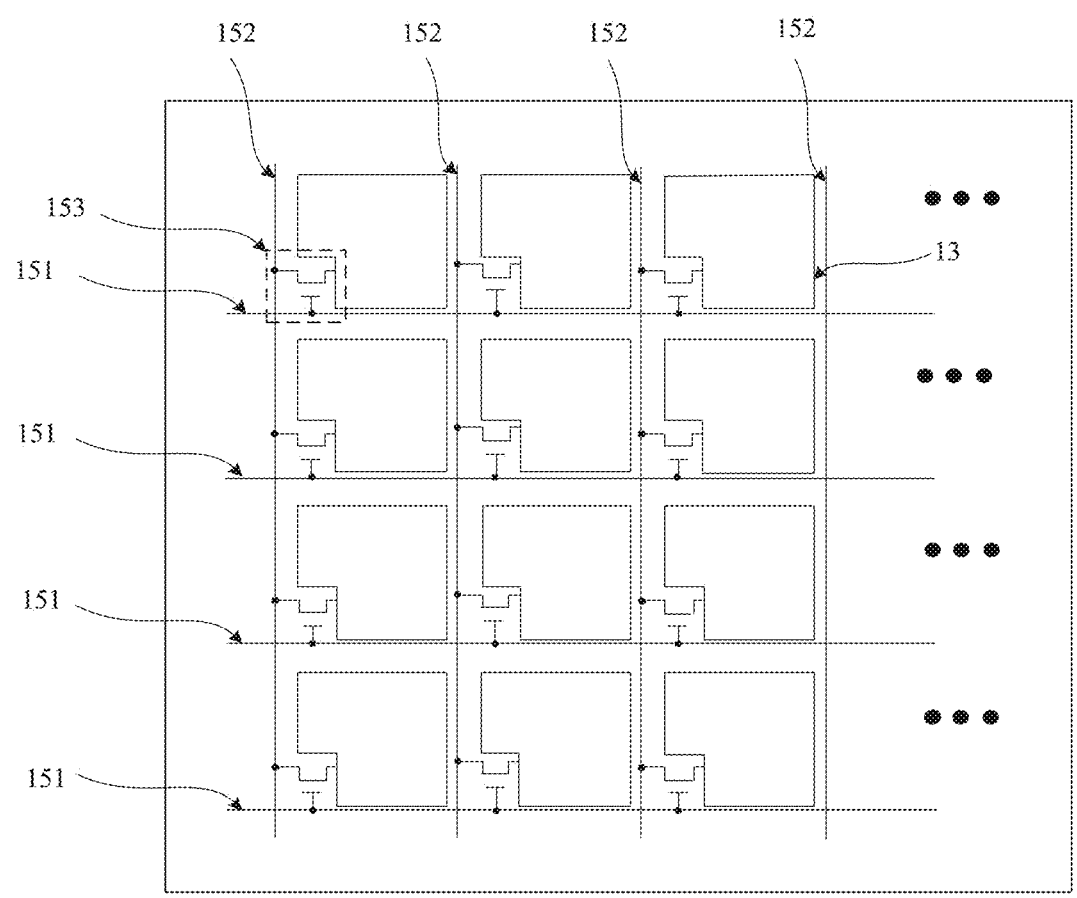
FIG. 4 is a diagram showing a connection structure between the pixel driver circuits and the pixel electrodes, in accordance with some embodiments of the present disclosure.

In some embodiments, referring to FIG. 3, the electronic ink screen 1 further includes a pixel driver circuit 15 disposed on the substrate 11, so as to apply data driving signals to the first electrodes 131 in the first electrode layer 13. Referring to FIG. 4, the pixel driving circuit 15 includes a plurality of gate lines 151 and a plurality of data lines 152 that are arranged crosswise, for example, arranged perpendicular to each other. The pixel driving circuit 15 further includes switch devices 153, such as thin film transistors (TFTs), which are connected to the gate lines GL and the data lines DL that cross each other. The display control device 2 is connected to the plurality of gate lines 151 to output scan signals to the plurality of gate lines 151, so as to control gating of the rows of pixels P connected to the plurality of gate lines 151. For example, the display control device 2 may scan the rows of pixels P row by row. That is, the display control device 2 may output scan signals to the plurality of gate lines 151 row by row in order from a first row of gate lines to a last row of gate lines, so that the switch devices 153 connected to the scanned gate lines 151 are in a turned-on state. The display control device 2 is connected to the plurality of data lines 152, so as to output data driving signals to the first electrodes 131 in the rows of pixels P that are gated (scanned), so that the pixels P present a corresponding color due to action of the electric field. For example, CM is 0V, HI is 15V, and LO is −15V. In this case, a 0V signal is provided to the second electrode layer, and a data driving signal in a range of −15V to 15V is provided to a first electrode 131, so as to control a magnitude of the electric field where the pixel P is located.

The electronic ink screen 1 is bistable. Even if the electric field is removed, the electronic ink screen 1 may still stay on a last refreshed image. Therefore, the electronic ink screen 1 does not require continuous power supply to maintain the image. In this way, the electronic ink display apparatus 100 may achieve low power consumption.

Figure 5:
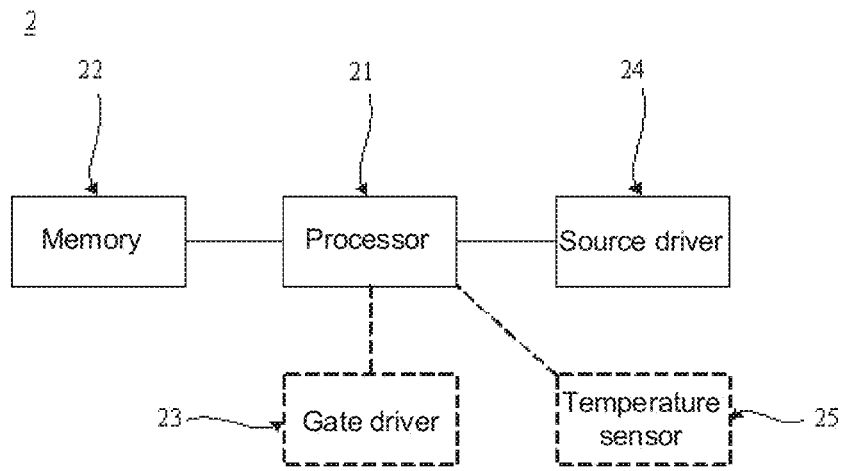
FIG. 5 is a diagram showing a structure of a display control device, in accordance with some embodiments of the present disclosure.

In some embodiments, referring to FIG. 5, the display control device 2 includes at least one processor 21, at least one memory 22, a gate driver 23 (optional), and a source driver 24.

The gate driver 23, which may also be referred to as a gate driving circuit, is configured to output scan signals to the electronic ink screen 1 under control of the at least one processor 21, so as to control gating of the rows of pixels. The gate driver 23 may be disposed in the display control device 2, or in the electronic ink screen 1, which is not limited in this embodiment. An example is taken in which the gate driver 23 is disposed in the display control device 2.

The source driver 24, which may also be referred to as a source driving circuit, is configured to output data driving signals to the electronic ink screen 1 under control of the at least one processor 21, so as to control the colors displayed by the pixels.

For example, the gate driver 23 and/or the source driver 24 may send a BUSY signal (busy status signal) to the processor 21 to inform the processor 21 of a state of itself (the gate driver 23 and/or the source driver 24). The processor 21 may determine whether to send a command or data to the gate driver 23 and/or the source driver 24 according to the BUSY signal. The processor 21 sends CLK (clock) signals to the gate driver 23 and the source driver 24 to provide the gate driver 23 and the source driver 24 with clocks required for their operations. In addition, the processor 21 may also send direct current (DC) signals to the gate driver 23 and the source driver 24 to inform the gate driver 23 and/or the source driver 24 of whether it is a command or data to be sent next. The source driver 24 may include a plurality of source driver sub-circuits. The processor 21 may send a chip select (CS) signal to one of the plurality of source driver sub-circuits to select the source driver sub-circuit for signal transmission. For example, the processor 21 may send a start scan command to the gate driver 23 to start scanning the first gate lines in the electronic ink screen; it may also send a data driving signal (i.e., data) to the source driver 24.

The memory may store computer programs and data. It may include a high speed random access memory, and may further include a non-volatile memory, such as a magnetic disk storage device, a flash memory device, and the like. It may be a read-only memory (ROM) or any other type of static storage device that can store static information and instructions, a random access memory (RAM), or any other type of dynamic storage device that can store information and instructions. It may also be a one time programmable (OTP) memory, an electrically erasable programmable read-only memory (EEPROM), a magnetic disk storage medium or other magnetic storage devices, or any other medium that may be used to carry or store program code in the form of instructions or data structures and that can be accessed by a computer, which is not limited thereto. The memory 22 may exist independently and be coupled to the processor 21 via a communication line. The memory may also be integrated with the processor 21.

The at least one processor 21 is connected to the gate driver 23, the source driver 24, and the at least one memory 22, and calls data in the memory 22 by running or executing a computer program stored in the memory 22, so as to control the gate driver 23 and the source driver 24 to output signals. The at least one processor 21 may be one or more general central processing units (CPUs), microcontroller units (MCUs), logic devices (Logics), and application-specific integrated circuits (ASICs) or integrated circuits for controlling program execution in some embodiments of the present disclosure. The CPUs may be single-core processors (single CPUs) or multi-core processors (multi-CPUs). The processor 21 herein may refer to one or more devices, circuits, or processing cores used for processing data (e.g., computer program instructions, etc.).

With continued reference to FIG. 5, the display control device 2 further includes a temperature sensor 25, which is connected to the at least one processor 21. The temperature sensor 25 is configured to measure an environmental temperature and send the environmental temperature to the at least one processor 21, so that the at least one processor 21 controls the source driver 24 to output data driving signals corresponding to the environmental temperature according to the environmental temperature.

Figure 6:
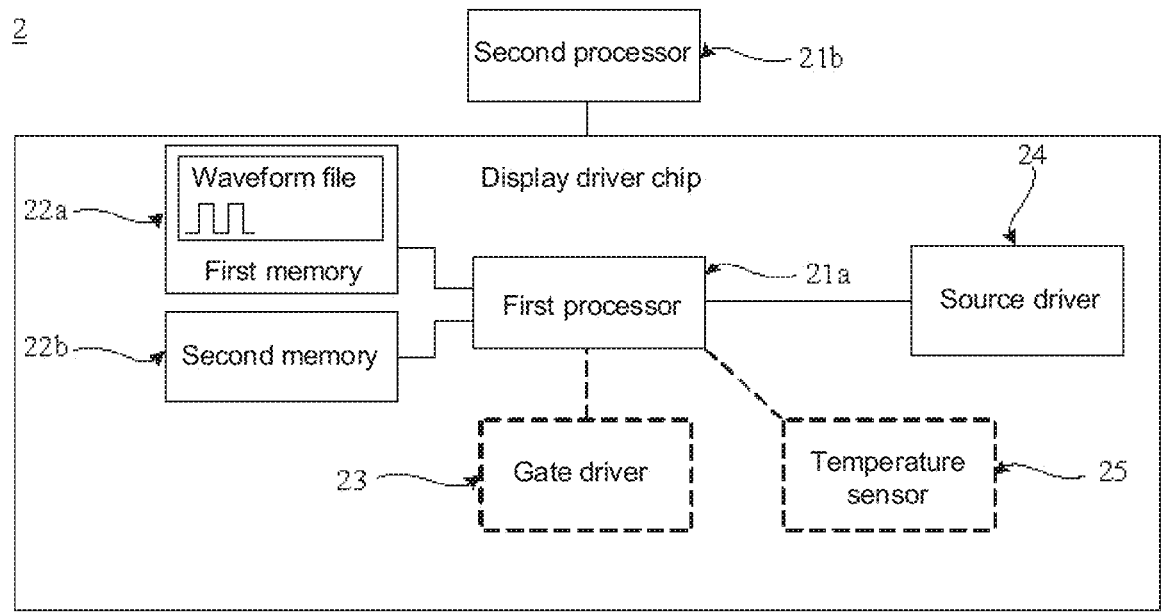
FIG. 6 is a diagram showing a structure of another display control device, in accordance with some embodiments of the present disclosure.

In some other embodiments, referring to FIG. 6, the at least one processor 21 in the display control device 2 includes: a first processor 21a and a second processor 21b.

As an example, the first processor 21*a* is a logic device (Logic), and the second processor 21*b* is a microprocessor. Compared to the microprocessor, the logic device may not include a data sending function. The at least one memory 22 may include: a first memory 22*a* and a second memory 22*b*. As an example, the first memory 22*a* is a one-time programmable memory, and the second memory 22*b* is a random access memory. As an example, the first processor 21*a* may implement a corresponding function by running a computer program stored in the first memory 22*a*.

In some examples, the first processor 21*a*, the first memory 22*a*, the second memory 22*b*, the gate driver 23, the source driver 24, and the temperature sensor 25 may be integrated together to serve as a display driver chip. The display driver chip and the second processor 21*b* are electrically connected through a serial peripheral interface (SPI).

In some embodiments, the communication device 3, as a device that exchanges information with an external device (an AP or a wireless router), is connected to the at least one processor 21. For example, the communication device 3 may be connected to the second processor 21*b*, so as to send data or commands to the external device, or receive data or commands sent by the external device, under the control of the processor 21. The communication device 3 may be a transceiver, a transceiver circuit, a transmitter, a receiver and the like. For example, it may be a wireless communication device such as a Wi-Fi device and a Bluetooth device, or a wired communication device such as a universal serial bus (USB) interface. The Wi-Fi device provides the electronic ink display apparatus 100 with network access following Wi-Fi related standard protocols. The Bluetooth device may be an integrated circuit or a Bluetooth chip. In some examples, the communication device 3 and the processor 21 may exist independently, or may be integrated together. For example, the communication device 3 may be integrated with the second processor 21*b*.

In some embodiments, the communication opposite-end device 200 may be a server or a terminal. The terminal may be a personal computer (PC), such as a desktop computer, a notebook computer, a tablet computer, an ultrabook, etc.; it may also be a handheld terminal, such as a mobile phone.

Based on the electronic ink display apparatus described above, some embodiments of the present disclosure provide a control method of the electronic ink screen 1. The execution subject may be the above-mentioned display control device 2 or a product including the above-mentioned display control device 2, e.g., the electronic ink display apparatus 100. As an example, the first color is a chromatic color, the second color is black, and the third color is white. Correspondingly, the first color charged particles may be chromatic color charged particles, the second color charged particles may be black charged particles, and the third color charged particles may be white charged particles. The chromatic color charged particles and the black charged particles have like charges, and the chromatic color charged particles have a larger mass than the black charged particles. The first color driving signal is the chromatic color driving signal, and sub-signals in a plurality of periods included in the first color driving signal may be: a second electric field cancellation signal, a chromatic color pull-down signal, a second dither signal, a first dither signal, a chromatic color first pull-up signal, a third electric field cancellation signal, and a chromatic color second pull-up signal. Sub-signals in a plurality of periods included in the second color driving signal may be: a black pull-down signal, a fourth dither signal, a fifth signal, a third dither signal, a fifth electric field cancellation signal, a black pull-up signal, and a sixth electric field cancellation signal. Sub-signals in a plurality of periods included in the third color driving signal may be: a white pull-down signal, a seventh dither signal, an eighth dither signal, a sixth dither signal, an eighth electric field cancellation signal, a white pull-up signal, and a ninth electric field cancellation signal. The control method of the electronic ink screen is described in detail below in combination with the example.

Figure 7:
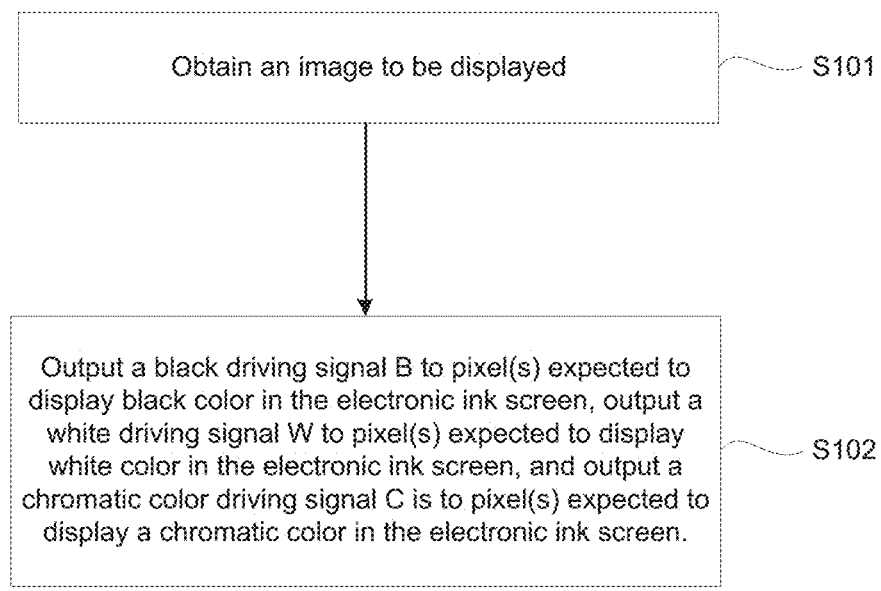
FIG. 7 is a flow diagram of a control method of an electronic ink screen, in accordance with some embodiments of the present disclosure.

As shown in FIG. 7, the control method includes steps 101 and 102 (S101 and S102).

In S101, an image to be displayed is obtained.

Figure 8:
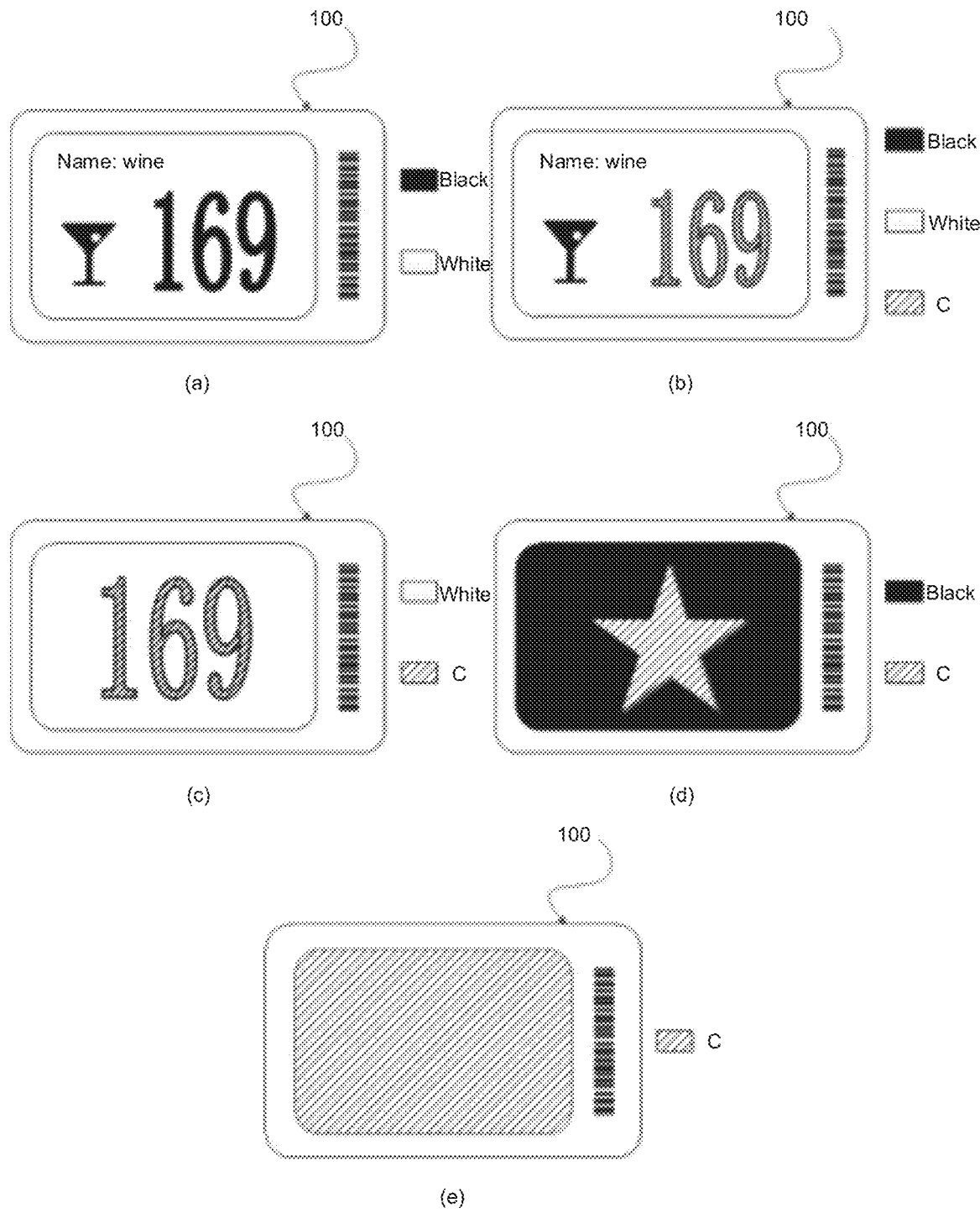
FIG. 8 illustrates images displayed on an electronic price tag, in accordance with some embodiments of the present disclosure.

An example is taken in which the electronic ink display apparatus 100 is used as an electronic price tag. An image to be displayed on the electronic price tag may be regarded as an image that has been input into the electronic price tag but has not yet been displayed. It may be an image that includes only two colors of black and white, as shown in (a) in FIG. 8. That is, the image to be displayed only includes black pixel data and white pixel data. It may also be an image that includes three colors of black, white and a chromatic color (e.g., red), as shown in (b) in FIG. 8. That is, the image to be displayed includes black pixel data, white pixel data, and chromatic color pixel data. It may also be an image that includes two colors of white and a chromatic color, as shown in (c) in FIG. 8. That is, the image to be displayed includes white pixel data and chromatic color pixel data. It may also be an image that includes two colors of black and a chromatic color, as shown in (d) in FIG. 8. That is, the image to be displayed includes black pixel data and chromatic color pixel data. Of course, it may also be an image shown in (e) in FIG. 8, i.e., a chromatic color image (e.g., a full-screen red image). In this case, the image to be displayed includes chromatic color pixel data.

The image to be displayed includes a plurality of pieces of pixel data. Each piece of pixel data may be composed of two bits of bit data, and the two bits of bit data determine a color to be displayed by a pixel corresponding to the pixel data in the electronic ink screen 1. if a pixel corresponding to a piece of pixel data displays black color, then the pixel data is called black pixel data. The same goes for white pixel data and color pixel data. For example, the pixel data includes four types of 00, 01, 10, and 11. Among them, 00 represents black pixel data, 01 represents white pixel data, 10 and 11 represent chromatic color pixel data. That is, in a case where a first bit of a piece of pixel data is 1, then the pixel data is chromatic color pixel data; otherwise, the pixel data is black pixel data or white pixel data.

In some examples, the communication opposite-end device 200 may send the image to be displayed to the electronic ink display apparatus 100 through a wireless router or a wireless AP 300. In the electronic ink display apparatus 100, the at least one processor 21 shown in FIG. 5 may receive the image to be displayed through the communication device 3 and store it in the at least one memory 22. For example, referring to FIG. 6, the second processor 21*b* in the display control device 2 may obtain the image to be displayed through the communication device 3 and send it to the first processor 21*a*. The first processor 21*a* receives the image to be displayed and stores it in the second memory 22*b*.

Figure 9:
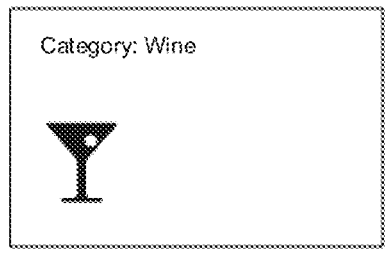
FIG. 9 illustrates a template image displayed on an electronic price tag, in accordance with some embodiments of the present disclosure.

In some other examples, the at least one memory 22 shown in FIG. 5 may store one or more images. For example, the one or more images may be image(s) to be displayed preset before the electronic display apparatus leaves factory. For another example; the one or more images may be template image(s). For an electronic price tag, a template image may include a sub-image showing fixed content (i.e., non-adjustable content) and a sub-image showing variable content (i.e., adjustable content). The fixed content may include content applicable to different categories, such as the name of the supermarket, reminder of discount and the like, and the variable content may include category, price, and other information. The sub-image showing variable content may be a white sub-image. For example, FIG. 9 shows a template image of a category of commodities (e.g., red wine). The template image may be read by the at least one processor 21 as an image to be displayed, so as to drive the electronic ink screen 1 to display the template image according to subsequent steps. Of course, after the at least one processor 21 receives information including the content to be displayed sent by the communication opposite-end device 200 through the communication device 3, the template image may be updated according to the information of the variable content, so as to generate a new image to be displayed (i.e., the image shown in (b) of FIG. 8). The image to be displayed includes a sub-image showing fixed content and a sub-image capable of presenting content to be displayed. The new image to be displayed may also be stored in the at least one memory 22 (e.g., the second memory 22*b*).

Then, S102 is performed.

In S102, a black driving signal B is output to pixel(s) expected to display black color in the electronic ink screen, a white driving signal W is output to pixel(s) expected to display white color in the electronic ink screen, and a chromatic color driving signal C is output to pixel(s) expected to display a chromatic color in the electronic ink screen.

In more detail, in a case where an image to be displayed includes chromatic color pixel data, the chromatic color driving signal C is output to the pixel(s) expected to display a chromatic color in the electronic ink screen. For example, in a case where the image to be displayed is an image with chromatic color as shown in (b), (c), (d) or (e) of FIG. 8, chromatic color driving signals C are output to pixel(s) expected to display the chromatic color in the electronic ink screen.

Similarly, in a case where an image to be displayed includes black pixel data, the black driving signal B is output to the pixel(s) expected to display black color in the electronic ink screen. For example, in a case where the image to be displayed is an image with black color as shown in (a), (b) or (d) in FIG. 8, black driving signals B are output to pixel(s) expected to display black color in the electronic ink screen.

In a case where an image to be displayed includes white pixel data, the white driving signal W is output to the pixel(s) expected to display white color in the electronic ink screen. For example, in a case where the image to be displayed is an image with white color as shown in (a), (b) or (c) in FIG. 8, white driving signals C are output to pixel(s) expected to display white color in the electronic ink screen.

The pixel(s) expected to display black color refers to the pixel(s) corresponding to the black pixel data of the image to be displayed, the pixel(s) expected to display white color refers to the pixel(s) corresponding to the white pixel data of the image to be displayed, and the pixel(s) expected to display chromatic color refers to the pixel(s) corresponding to the chromatic color pixel data of the image to be displayed.

Figure 10:
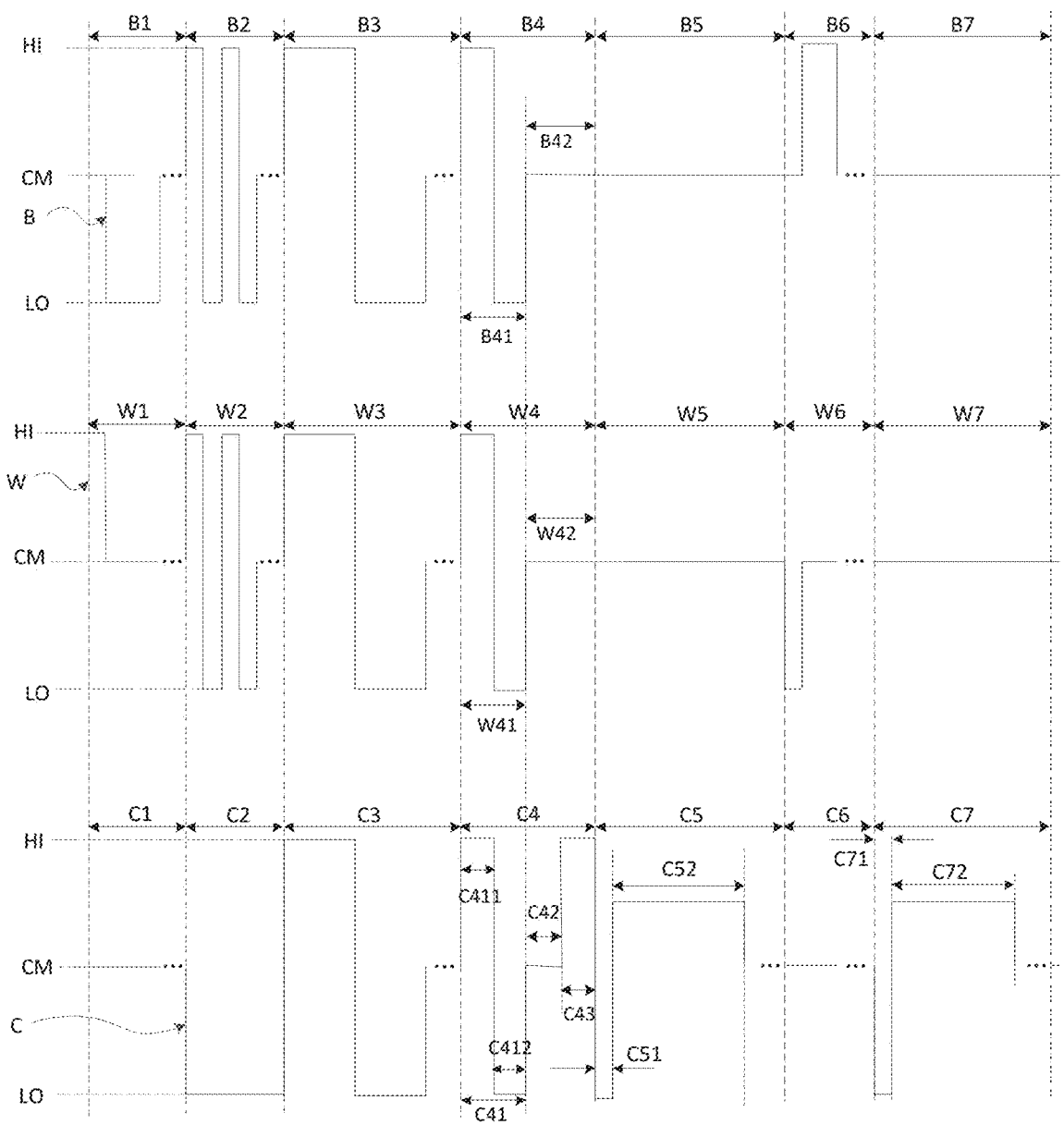
FIG. 10 is a waveform diagram of data driving signals in a control method of an electronic ink screen, in accordance with some embodiments of the present disclosure.
Figure 11:
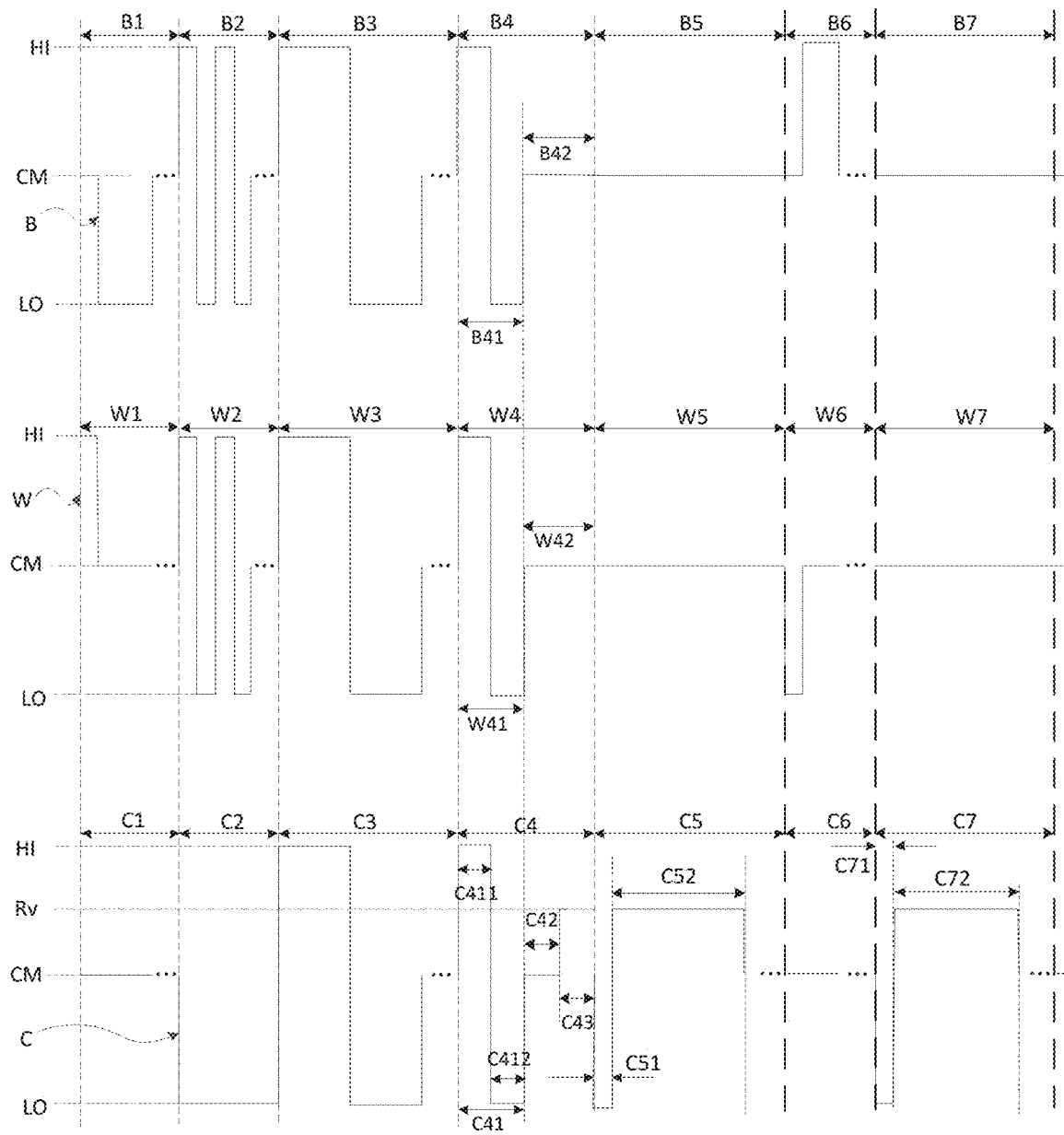
FIG. 11 is a waveform diagram of other data driving signals in a control method of an electronic ink screen, in accordance with some embodiments of the present disclosure.

In the process of displaying the image to be displayed, in order to synchronize a refresh process of pixels expected to display different colors, as shown in FIG. 10 or 11, a duration $T_B$ of the black driving signal B, a duration $T_W$ of the white driving signal W, and a duration $T_C$ of the chromatic color driving signal C are equal or substantially equal. The durations of the three are substantially equal means that an absolute value of a difference between every two of the driving signals is less than or equal to a preset value.

As shown in FIG. 10 or 11, the black driving signal B, the white driving signal W, and the chromatic color driving signal C all include sub-signals in a plurality of periods (i.e., N periods, N is greater than or equal to 2 (N≥2)). In some examples, N is greater than or equal to 3 (N≥3). For example, N is equal to 7 (N=7). In some examples, the durations of the sub-signals of the N periods may be the same or different. In the embodiments of the present disclosure, an example is taken in which the durations of sub-signals in at least two of the N periods are different.

In some embodiments, referring to FIG. 10 or 11, the chromatic color driving signal may include a first dither signal C4 and a chromatic color first pull-up signal C5 in adjacent periods, and the chromatic color first pull-up signal is in a period immediately after a period corresponding to the first dither signal.

For example, in addition to the first dither signal C4 and the first chromatic color pull-up signal C5, the chromatic color driving signal may further include sub-signals in at least one period. For example, in a case where N is equal to 7 (N=7), sub-signals in a first period to a seventh period included in the chromatic color driving signal are sequentially: a second electric field cancellation signal C1, a chromatic color pull-down in signal C2, a second dither signal C3, a first dither signal C4, a chromatic color first pull-up signal C5, a third electric field cancellation signal C6, and a chromatic color second pull-up signal C7.

The second electric field cancellation signal C1 (or the third electric field cancellation signal C6) is a signal that causes the electric field where the pixel is located to be zero, and the second electric field cancellation signal C1 (or the third electric field cancellation signal C6) and the second electrode layer have a same potential.

The chromatic color pull-down signal C2 is configured to drive chromatic color charged particles in the pixel(s) expected to display the chromatic color to move toward a side away from the display surface of the electronic ink screen, so as to balance the running (movement) of the chromatic color charged particles.

The second dither signal C3 includes a second rectangular wave signal, and a frequency of the second rectangular wave signal is a second frequency, so that the chromatic color charged particles are oscillated in advance.

The first dither signal C4 includes a first rectangular wave signal C41, a first electric field cancellation signal C42, and a first constant voltage signal C43. The first rectangular wave signal C41 includes a first level signal C411 and a second level signal C412 that are alternately output. A frequency of the first rectangular wave signal C41 is a first frequency. The first frequency is greater than the second frequency, so that black charged particles and chromatic color charged particles continue to oscillate, so as to separate the black charged particles and the chromatic color charged particles. The first electric field cancellation signal C42 is a signal that causes the electric field where the pixel is located to be zero. The first electric field cancellation signal C42 has a same potential as the second electrode layer, so that there is no voltage difference between the first electrode and the second electrode layer in the pixel, and the black charged particles and the chromatic color charged particles in the pixel are further separated by inertia. The first constant voltage signal C43 is configured to drive chromatic color charged particles in the pixel(s) expected to display the chromatic color to move toward a side proximate to the display surface of the electronic ink screen. In this case, the black charged particles also move toward the display surface. When a voltage of the first constant voltage signal C43 is large enough, the image may be completely black. Compared to a phase corresponding to the first electric field cancellation signal C42, the chromatic color charged particles are closer to the display surface at this time.

The chromatic color first pull-up signal C5 is configured to drive chromatic color charged particles in the pixel to move toward the side proximate to the display surface of the electronic ink screen. After being driven by the chromatic color first pull-up signal C5, the chromatic color charged particles may further move toward the display surface, thereby enhancing a display effect of the chromatic color.

The chromatic color second pull-up signal C7 is configured to drive chromatic color charged particles in the pixel (s) expected to display the chromatic color to move toward a side proximate to the display surface of the electronic ink screen, so that the pixel displays the chromatic color.

The chromatic color first pull-up signal C5 includes a black first pull-down sub-signal C51 and a chromatic color first pull-up sub-signal C52, and the chromatic color second pull-up signal C7 includes a black second pull-down sub-signal C71 and a chromatic color second pull-up sub-signal C72. The black first pull-down sub-signal C51 and the black second pull-down sub-signal C71 are configured to pull down the black charged particles to a side farther away from the display surface of the electronic ink screen than the chromatic color charged particles. The chromatic color first pull-up sub-signal C52 and the chromatic color second pull-up sub-signal C72 are configured to pull up the chromatic color charged particles and the black charged particles at the same time. Since a mass of the black charged particles is less than a mass of the chromatic color charged particles (for example, a volume of the black charged particles is smaller than a volume of the chromatic color charged particles), the black charged particles may move faster than the chromatic color charged particles under action of a same pull-up signal. In order to prevent the black charged particles from moving to the side closer to the display surface of the electronic ink screen than the chromatic color charged particles, amplitudes of the chromatic color first pull-up sub-signal C52 and the chromatic color second pull-up sub-signal C72 are set to be smaller than the amplitudes of the black pull-up signal B6 and the white pull-up signal W6. For example, the chromatic color first pull-up signal C5 and the chromatic color second pull-up signal C7 may be identical.

The chromatic color first pull-up sub-signal C52 in the chromatic color first pull-up signal C5 is a second constant voltage signal, and a voltage value of the second constant voltage signal is between a voltage value of the first level signal and a voltage value of the second level signal. The difference between the voltage value of the second constant voltage signal and CM is any voltage value in a range of 4 V to 12 V. For example, in a case where HI is +15 V, LO is −15 V, and CM is 0 V, the voltage value (which is represented by RV) of the chromatic color first pull-up sub-signal C52 (i.e., the second constant voltage signal) may be any voltage value in the range of 4 V to 12 V, e.g., 12V.

For example, the black charged particles and the chromatic color charged particles have charges of the same polarity, and the mass of the black charged particles is less than the mass of the chromatic color charged particles. When the chromatic color first pull-up sub-signal C52 acts on the chromatic color charged particles to cause the chromatic color charged particles move toward the side proximate to the display surface of the electronic ink screen, it will also act on the black charged particles at the same time and cause the black charged particles to move toward the side proximate to the display surface of the electronic ink screen. Consequently, black charged particles are mixed into the chromatic color charged particles for displaying chromatic portions of the electronic ink screen, resulting in chromatic aberration. In order to solve this problem, the black first pull-down sub-signal C51 may be used to layer the black charged particles and the chromatic color charged particles, and to pull down the black charged particles to a side farther away from the display surface of the electronic ink screen than the chromatic color charged particles. After that, when the chromatic color first pull-up sub-signal C52 acts on the chromatic color charged particles, even if it also acts on the black charged particles at the same time, the black charged particles may be on the side farther away from the display surface of the electronic ink screen than the chromatic color charged particles. Therefore, the black charged particles may not be mixed in the chromatic color charged particles.

In addition, after the pixel(s) expected to display the chromatic color are driven by the first dither signal C4, the black first pull-down sub-signal C51 in the chromatic color first pull-up signal C5 may cause the black charged particles in the pixel(s) expected to display the chromatic color to move down faster than the chromatic color charged particles, and to move to the side of the chromatic color charged particles away from the display surface. The chromatic color charged particles, driven by the second constant voltage signal, may continue to move toward a side of the display surface, thereby presenting a better display effect of the red color.

In some examples, the chromatic color driving signal C can be expressed as:

{CM, CM, CM, CM}, // Sub-signals in the first period;
{LO, LO, LO, LO}, // Sub-signals in the second period;
{HI, LO, HI, LO}, // Sub-signals in the third period;
{HI, LO, CM, HI}, // Sub-signals in the fourth period;
{LO, CM, RV, CM}, // Sub-signals in the fifth period;
{CM, CM, RV, CM}, // Sub-signals in the sixth period; and
{LO, CM, RV, CM}, // Sub-signals in the seventh period.

Each line represents a cyclic unit in the sub-signals of a period. That is, a cyclic unit includes the above four parts.

A duration (or a number of frames) corresponding to the sub-signals of each period is as follows. A last duration in each line is the number of repetitions (the number of cycles) of the cyclic unit included in the sub-signals of a period, i.e., the number of cycles of the four parts. The duration is represented by the number of unit durations. In some examples, the number of unit durations may be a hexadecimal number. For example, the duration is 0x0a, which means 10 unit durations.

{0x0a, 0x08, 0x12, 0x1a, 0x01}, // Sub-signals in the first period;
{0x04, 0x04, 0x04, 0x04, 0x02}, // Sub-signals in the second period;
{0x06, 0x08, 0x06, 0x08, 0x0a}, // Sub-signals in the third period;
{0x03, 0x04, 0x01, 0x0d, 0x01}, // Sub-signals in the fourth period;
{0x04, 0x00, 0x16, 0x06, 0x09}, // Sub-signals in the fifth period;

{0x08, 0x08, 0x00, 0x00, 0x09}, // Sub-signals in the sixth period; and

{0x03, 0x00, 0x1a, 0x00, 0x01}, // Sub-signals in the seventh period.

With sub-signals in the fourth period (the first dither signal C4) as an example, the four parts in a cyclic unit include: a HI signal with a duration of 0x03, a LO signal with a duration of 0x04, a CM signal with a duration of 0x01, and a H signal with a duration of 0x0d (d=13). The cyclic unit is repeated only once.

Figure 12:
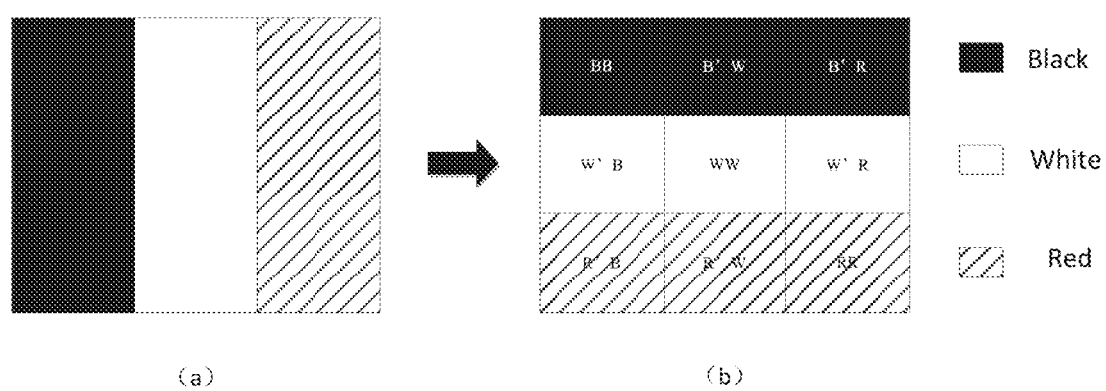
FIG. 12 illustrates two images to be displayed used in testing an afterimage effect, in accordance with some embodiments of the present disclosure.

The electronic ink screen is driven based on the chromatic color driving signal C in the specific examples above, and the afterimage in the displayed image is tested. In a normal temperature environment (between 22° C. and 30° C.), the electronic ink display apparatus refreshes the image shown in (a) in FIG. 12 10 times, with an interval of 30s between two adjacent times, and an image displayed after each refresh is still the image in (a) in FIG. 12. Then, the image shown in (b) in FIG. 12 is displayed, and after the image is still, the image shown in (b) of FIG. 12 is optically measured by an optical instrument (e.g., Eye-One or 700D) to measure the L*, a* and b* of 9 areas. Herein, L* is brightness, a* is red-green chromaticity, b* is blue-yellow chromaticity, and ΔE' is afterimage value.

The following formulas are used to calculate the afterimage in the red image:

$$\Delta E_{R'B}^* = \sqrt{(L_{R'B}^* - L_{RR}^*)^2 + (a_{R'B}^* - a_{RR}^*)^2 + (b_{R'B}^* - b_{RR}^*)^2};$$

$$\Delta E_{R'W}^* = \sqrt{(L_{R'W}^* - L_{RR}^*)^2 + (a_{R'W}^* - a_{RR}^*)^2 + (b_{R'W}^* - b_{RR}^*)^2};$$

The data shown in Table 1 is obtained.

TABLE 1

| RR (reference value) | | | R'B (sample value) | | | | R'W (sample value) | | | |
|---|---|---|---|---|---|---|---|---|---|---|
| $L^*_{RR}$ | $a^*_{RR}$ | $b^*_{RR}$ | $L^*_{R'B}$ | $a^*_{R'B}$ | $b^*_{R'B}$ | $\Delta E^*_{R'B}$ | $L^*_{R'W}$ | $a^*_{R'W}$ | $b^*_{R'W}$ | $\Delta E^*_{R'W}$ |
| 28.5 | 38.5 | 21.0 | 28.4 | 38.8 | 20.5 | 0.37 | 28.5 | 38.6 | 21.1 | 0.08 |

However, if the driving method in the related art is adopted, the data in Table 2 is obtained.

TABLE 2

| RR (reference value) | | | R'B (sample value) | | | | R'W (sample value) | | | |
|---|---|---|---|---|---|---|---|---|---|---|
| $L^*_{RR}$ | $a^*_{RR}$ | $b^*_{RR}$ | $L^*_{R'B}$ | $a^*_{R'B}$ | $b^*_{R'B}$ | $\Delta E^*_{R'B}$ | $L^*_{R'W}$ | $a^*_{R'W}$ | $b^*_{R'W}$ | $\Delta E^*_{R'W}$ |
| 26.5 | 37.5 | 22.0 | 28.1 | 38.7 | 19.5 | 2.17 | 28.9 | 39.1 | 22.1 | 1.89 |

It will be seen that in the related art, in a normal temperature environment, in the afterimage test result of a red image, both the brightness L* and the red-green chromaticity a* decrease. As a result, an afterimage value $\Delta E^*_{R'B}$ of transitioning from displaying a black image to displaying a red image is greater than 0.5 ($\Delta E^*_{R'B} > 0.5$), and an afterimage value $\Delta E^*_{R'W}$ of transitioning from displaying a white image to displaying a red image is greater than 0.5 ($\Delta E^*_{R'W} > 0.5$). (However, a preset range Spc is less than 0.5). Consequently, the display effect is poor. By using the solution of the embodiments disclosed herein, the brightness L* and the red-green chromaticity a* of red color may be increased, and the afterimage value ΔE* may be reduced, so that $\Delta E^*_{R'B}$ and $\Delta E^*_{R'W}$ are both less than 0.5. That is, they both meet the requirements of the above preset range. The lower afterimage value ΔE*, the less obvious the afterimage during transition from the previous image to the next image, and the better the display effect. Therefore, the solution of the embodiments herein may achieve a better display effect.

The first rectangular wave signal C41 in the first dither signal C4 includes the first level signal C411 and the second level signal C412 that are alternately output. In some examples, the voltage value of the first level signal C411 is HI, which, for example, may be +15 V; and the voltage value of the second level signal C412 is LO, which, for example, may be −15 V.

In some embodiments of the present disclosure, the voltage value of the first constant voltage signal C43 is substantially equal to the voltage value of one of the first level signal C411 and the second level signal C412. In some examples, referring to FIG. 10, in a case where the chromatic color charged particles in the pixel are positively charged and the second electrode 14 is closer to the display surface than the first electrode 13, the voltage value of the first constant voltage signal C43 may be 15±2 V (i.e., in a range of 13 V to 17 V). For example, it may be +15 V.

In some other embodiments of the present disclosure, the voltage value of the first constant voltage signal C43 is between the voltage value of the first level signal C411 and the voltage value of the second level signal C412. For example, referring to FIG. 11, the difference between the voltage value of the first constant voltage signal C43 and CM may be any voltage value in a range of 4V to 12V. In a case where CM is 0V, the voltage value of the first constant voltage signal C43 may be any voltage value in a range of 4V to 12V. For example, the voltage value of the first constant voltage signal C43 may be equal to the voltage value RV of the first color pull-up sub-signal C52 (i.e., the second constant voltage signal).

In some embodiments, referring to FIG. 10 or 11, the black driving signal B includes sub-signals in the plurality of periods (i.e., N periods, N is greater than or equal to 2 (N≥2)). The black driving signal B includes a third dither signal B4. The third dither signal B4 is a sub-signal in a same period as the first dither signal C4 in the chromatic color driving signal C.

For example, the black driving signal B further includes at least one sub-signal in addition to the third dither signal B4. For example, as shown in FIG. 10 or 11, in a case where N is equal to 7 (N=7), sub-signals from a first period to a seventh period included in the black driving signal B are sequentially: a black pull-down signal B1, a fourth dither signal B2, a fifth dither signal B3, the third dither signal B4, a fifth electric field cancellation signal B5, a black pull-up signal B6 and a sixth electric field cancellation signal B7.

The black pull-down signal B1 is configured to drive the black charged particles in the pixel(s) expected to display black color to move toward a side away from the display surface of the electronic ink screen, so as to balance the running (movement) of the black charged particles.

The fourth dither signal B2 includes a fourth rectangular wave signal, and a frequency of the fourth rectangular wave signal is a fourth frequency. The fourth dither signal B2 is configured to cause the black charged particles to oscillate in advance.

The fifth dither signal B3 includes a fifth rectangular wave signal, and a frequency of the fifth rectangular wave signal is a fifth frequency. The fifth dither signal is configured to cause the black charged particles to continue to oscillate.

The third dither signal B4 includes a third rectangular wave signal B41 and a fourth electric field cancellation signal B42 that are output in sequence. A frequency of the third rectangular wave signal B41 is a third frequency, so that black charged particles continue to oscillate, so as to separate the black charged particles and the chromatic color charged particles. The fourth electric field cancellation signal B42 is a signal that causes the electric field where the pixel is located to be zero, so that the charged particles of various colors continue to move according to inertia, and the power used in the fourth period may be saved.

The fifth electric field cancellation signal B5 (or the sixth electric field cancellation signal B7) is a signal that causes the electric field where the pixel is located to be zero.

The black pull-up signal B6 is configured to drive the black charged particles in the pixel(s) expected to display black color to move toward the side proximate to the display surface of the electronic ink screen, so that the pixel(s) displays black color.

The third frequency of the third rectangular wave signal B41 in the third dither signal B4 is greater than the fifth frequency of the fifth rectangular wave signal in the fifth dither signal B3.

In some embodiments, referring to FIG. 10 or 11, the white driving signal W includes sub-signals in the plurality of periods (i.e., N periods, N is greater than or equal to 2 (N≥2)). The white driving signal W includes a sixth dither signal W4. The sixth dither signal W4 is a sub-signal in a same period as the first dither signal C4 in the chromatic color driving signal C.

For example, the white driving signal W further includes at least one sub-signal in addition to the sixth dither signal W4. As shown in FIG. 10 or 11, in a case where N is equal to 7 (N=7), sub-signals from a first period to a seventh period included in the white driving signal W are sequentially: a white pull-down signal W1, a seventh dither signal W2, an eighth dither signal W3, the sixth dither signal W4, an eighth electric field cancellation signal W5, a white pull-up signal W6 and a ninth electric field cancellation signal W7.

The white pull-down signal W1 is configured to drive the white charged particles in the pixel(s) expected to display white color to move toward a side away from the display surface of the electronic ink screen, so as to balance the running (movement) of the white charged particles.

The seventh dither signal W2 includes a seventh rectangular wave signal, and a frequency of the seventh rectangular wave signal is a seventh frequency. The seventh dither signal W2 is configured to cause the white charged particles to oscillate in advance.

The eighth dither signal W3 includes an eighth rectangular wave signal, and a frequency of the eighth rectangular wave signal is an eighth frequency. The eighth dither signal is configured to cause the white charged particles to continue to oscillate.

The sixth dither signal W4 includes a sixth rectangular wave signal W41 and a seventh electric field cancellation signal W42 that are output in sequence. A frequency of the sixth rectangular wave signal is a sixth frequency, so that the black charged particles and the red charged particles are separated. The seventh electric field cancellation signal W42 is a signal that causes the electric field where the pixel is located to be zero.

The eighth electric field cancellation signal W5 (or the ninth electric field cancellation signal W7) is a signal that causes the electric field of the pixel to be zero, which has a same potential as the second electrode layer, so that there is no voltage difference between the first electrode and the second electrode layer in the pixel.

The white pull-up signal W6 is configured to drive the white charged particles in the pixel(s) expected to display white color to move toward the side proximate to the display surface of the electronic ink screen, so that the pixel displays white color.

The sixth frequency of the sixth rectangular wave signal W41 in the sixth dither signal W4 is greater than the eighth frequency of the eighth rectangular wave signal in the eighth dither signal W3.

Since the chromatic color charged particles have a greater mass than the black charged particles, the chromatic color pull-down signal C2 has a longer effective duration than the black pull-down signal B1 and the white pull-down signal W1. The chromatic color charged particles need to be pulled up twice. The duration of the chromatic color first pull-up signal C5 is longer than durations of the black pull-up signal B6 and the white pull-up signal W6, and the duration of the chromatic color second pull-up signal C7 is longer than durations of the black pull-up signal B6 and the white pull-up signal W6.

In some embodiments of the present disclosure, the third frequency of the third rectangular wave signal B41 in the third dither signal B4 is equal to the first frequency of the first rectangular wave signal C41 in the first dither signal C4 and the fifth frequency of the fifth rectangular wave signal in the fifth dither signal B3 is equal to the second frequency of the second rectangular wave signal in the second dither signal C3, thereby simplifying a driving process.

In some other embodiments of the present disclosure, the sixth frequency of the sixth rectangular wave signal W41 in the sixth dither signal W4 is equal to the first frequency of the first rectangular wave signal C41 in the first dither signal C4, and the eighth frequency of the eighth rectangular wave signal in the eighth dither signal W3 is equal to the second frequency of the second rectangular wave signal in the second dither signal C3, thereby simplifying a driving process.

In some embodiments, an entire process of displaying an image to be displayed is divided into N display driving periods, and in each display driving period, only one sub-signal in a corresponding period of each data driving signal is output to each pixel. S102 includes the following steps.

In the I-th display driving period of displaying the image to be displayed, each row of pixels of the electronic ink screen 1 is sequentially scanned. For example, the at least one processor 21 in the display control device 2 can control the gate driver 23 to output scan signals to the gate lines in the electronic ink screen 1 one by one. That is, the rows of pixels are sequentially gated from a first row to a last row. Of course, the order of scanning by row is not limited thereto. For example, the odd rows of pixels may be scanned first, and then the even rows of pixels are scanned. I is greater than or equal to 1 (I≥1), which means that the I-th period can be any period. For example, in a case where three driving signals all include N periods, I is greater than or equal to 1 and less than or equal to N (1≤I≤N). That is, I=1, 2, 3, . . . , or N.

A sub-signal in the I-th period of the black driving signal B is output to pixel(s) expected to display black color in each row of pixels scanned, a sub-signal in the I-th period of the white driving signal W is output to pixel(s) expected to display white color in each row of pixels scanned, and a sub-signal in the I-th period of the chromatic color driving signal C is output to pixel(s) expected to display the chromatic color in each row of pixels scanned. In some examples, the at least one processor 21 in the display control device 2 may control the source driver 24 to output corresponding sub-signals to each row of pixels scanned. For example, in the second display driving period, the sub-signal W2 in the white driving signal W is output to the pixel(s) expected to display white color, the sub-signal B2 in the black driving signal B is output to the pixel(s) expected to display black color; and the sub-signal C2 in the chromatic color driving signal C is output to the pixel(s) expected to display the chromatic color.

It will be seen that in this embodiment, in a process in which a chromatic color image (including three colors of black, white, and a chromatic color) is refreshed once, there are N display driving periods. In each display driving period; each row of pixels needs to be scanned and sub-signals corresponding to the display driving period are output to each row of pixels. In this way, when the number of sub-signals included in a data driving signal changes, there is no need to change the scan signals and related clock signals.

In some other embodiments, each row of pixels may be scanned row by row, and when a row of pixels is being scanned, a corresponding data driving signal (including N sub-signals) is output to each pixel in the row of pixels; then, a next row of pixels is scanned.

In some embodiments, the display control device 2 may store a waveform file LUT WF_B of the black driving signal B, a waveform file LUT WF_W of the white driving signal W, and a waveform file LUT WF_C of the chromatic color driving signal C. The waveform file is data used to characterize the data driving signal shown in FIG. 10 or 11. For example, referring to FIG. 5, each waveform file may be stored in the at least one memory 22 in the display control device 2. The at least one processor 21 in the display control device 2 may control the source driver 24 to output a corresponding data driving signal to each pixel according to the image to be displayed stored in the at least one memory 22 and the waveform files stored in the at least one memory 22. In more detail, the black driving signal corresponding to the black waveform file LUT WF_B is output to the pixel(s) expected to display black color according to the stored black waveform file in LUT WF_B; the white driving signal corresponding to the white waveform file LUT WF_W is output to the pixel(s) expected to display white color according to the stored white waveform file LUT WF_W; and, the chromatic color driving signal corresponding to the chromatic color waveform file LUT WF_C is output to the pixel(s) corresponding to chromatic color pixel data in the image to be displayed according to the stored chromatic color waveform file LUT WF_C.

It will be noted that, the number of LUT WF_B files, LUT WF_W files and LUT WF_C files may be at least two, so that the files correspond to different temperatures respectively. For example, according to a temperature sensed by the temperature sensor 25, different waveform files (including: LUT WF_B, LUT WF_W, and LUT WF_C files) corresponding to the sensed temperature may be found from the at least one memory 22, and corresponding data driving signals are output to each pixel according to these waveform files. In this way, the data driving signals may be adjusted according to the temperature, so as to display a satisfactory image.

In some embodiments, the display control device may be divided into a plurality of functional modules according to the above method embodiments. For example, the display control device may be divided by assigning one function to one functional module; or, two or more functions may be integrated into one functional module. The above integrated module may be implemented in a form of hardware or in a form of a software functional module. It will be noted that, the division of the functional modules in some embodiments of the present disclosure is merely schematic, and is only a division of logical functions, and there may be other division manners in actual implementation.

As shown in FIG. 5, some embodiments of the present disclosure further provide a display control device 2. As for specific functions that can be implemented by the display control device 2, reference may be made to the above embodiments, and details will not be repeated here.

The display control device 2 includes a source driver 24 and at least one processor 21. The at least one processor 21 is configured to control the source driver 24 to output the first color driving signal to the pixel(s) expected to display the first color in the electronic ink screen. The first color driving signal includes sub-signals in a plurality of periods, and the sub-signals in the plurality of periods include a first dither signal and a first color first pull-up signal in adjacent periods. The first color first pull-up signal is in a period immediately after a period corresponding to the first dither signal.

The first dither signal includes: a first rectangular wave signal, a first electric field cancellation signal and a first constant voltage signal that are output in sequence. The first constant voltage signal is configured to drive the first color charged particles in the pixel(s) expected to display the first color to move toward the side proximate to the display surface of the electronic ink screen.

The first color first pull-up signal is configured to drive the first color charged particles in the pixel(s) expected to display the first color to move toward the side proximate to the display surface of the electronic ink screen.

In some embodiments, the at least one processor 21 is further configured to control the source driver 24 to output the second color driving signal to the pixels) expected to display the second color in the electronic ink screen.

The second color driving signal includes sub-signals in a plurality of periods. A sub-signal in the second color driving signal in a same period as the first dither signal is a third dither signal, and the third dither signal includes: a third rectangular wave signal and a fourth electric field cancellation signal that are output in sequence.

In some embodiments, the at least one processor 21 is further configured to control the source driver 24 to output the third color driving signal to the pixel(s) expected to display the third color in the electronic ink screen.

The third color driving signal includes sub-signals in a plurality of periods. A sub-signal in the third color driving signal in the same period as the first dither signal is a sixth dither signal, and the sixth dither signal includes a sixth rectangular wave signal and a seventh electric field cancellation signal that are output in sequence.

In some embodiments, the display control device 2 further includes a gate driver.

In this case, the at least one processor 21 is configured to control the gate driver to sequentially scan each row of pixels in the electronic ink screen in the I-th display driving period of displaying the image to be displayed, and control the source driver 24 to output a sub-signal in the I-th period of the second color driving signal to the pixel(s) expected to display the second color in each row of pixels scanned, output a sub-signal in the I-th period of the third color driving signal to the pixel(s) expected to display the third color in each row of pixels scanned, and output a sub-signal in the I-th period of the first color driving signal to the pixel(s) expected to display the first color in each row of pixels scanned. Herein, I is greater than or equal to 1 (I≥1), and the second color driving signal, the third color driving signal and the first color driving signal include the same number of periods.

In some embodiments, the display control device 2 further includes: at least one memory 22 configured to store the second color waveform file, the third color waveform file, and the first color waveform file.

In this case, the at least one processor 21 is further configured to control the source driver to output the second color driving signal corresponding to the second color waveform file to pixel(s) expected to display the second color according to the stored second color waveform file, output the third color driving signal corresponding to the third color waveform file to the pixel(s) expected to display the third color according to the stored third color waveform file, and output the first color driving signal corresponding to the first color waveform file to the pixel(s) expected to display the first color according to the stored first color waveform file.

The at least one memory 22 is further configured to store the image to be displayed.

Some embodiments of the present disclosure provide a computer-readable storage medium (e.g., a non-transitory computer-readable storage medium). The computer readable storage medium has stored thereon computer program instructions that, when executed on a processor, cause the computer (e.g., the electronic ink display apparatus) to perform one or more steps in the control method of the electronic ink screen as described in any one of the above embodiments.

For example, the computer-readable storage medium may include, but is not limited to a magnetic storage device (i.e., a hard disk, a floppy disk or magnetic tape), an optical disk (i.e., a compact disk (CD), a digital versatile disk (DVD), etc.), a smart card or a flash memory device (i.e., an erasable programmable read-only memory (EPROM), a card, a stick, a key driver, etc.). Various computer-readable storage media described in the present disclosure may represent one or more devices and/or other machine-readable storage media for storing information. The term "machine-readable storage media" may include, but is not limited to, wireless channels and various kinds of other media capable of storing, containing and/or carrying instructions and/or data.

Some embodiments of the present disclosure provide a computer program product. The computer program product includes computer program instructions that, when executed on a computer, cause the computer to perform one or more steps in the control method of the electronic ink screen as described in the above embodiments.

Some embodiments of the present disclosure provide a computer program. When executed on a computer, the computer program causes the computer to perform one or more steps in the control method of the electronic ink screen as described in the above embodiments.

Beneficial effects of the computer-readable storage medium, the computer program product, and the computer program are the same as those of the control method of the electronic ink screen as described in some embodiments above, and details will not be repeated herein.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A control method of an electronic ink screen, the electronic ink screen including a plurality of pixels, at least one pixel including first color charged particles, the control method of the electronic ink screen comprising:
  outputting a first color driving signal to at least one pixel expected to display a first color in the electronic ink screen, wherein
  the first color driving signal includes sub-signals in a plurality of periods; the sub-signals in the plurality of periods include a first dither signal and a first color first pull-up signal in adjacent periods, and the first color first pull-up signal is in a period immediately after a period corresponding to the first dither signal;
  the first dither signal includes: a first rectangular wave signal, a first electric field cancellation signal and a first constant voltage signal that are output in sequence; the first constant voltage signal is configured to drive the first color charged particles in the pixel expected to display the first color to move toward a side proximate to a display surface of the electronic ink screen;
  the first color first pull-up signal is configured to drive the first color charged particles in the pixel expected to display the first color to move toward the side proximate to the display surface of the electronic ink screen; and
  the sub-signals in the plurality of periods included in the first color driving signal include sub-signals in seven periods, and the sub-signals in a first period to a seventh period included in the first color driving signal sequentially are:
    a second electric field cancellation signal;
    a first color pull-down signal configured to drive the first color charged particles in the pixel expected to display the first color to move toward a side away from the display surface of the electronic ink screen;
    a second dither signal including a second rectangular wave signal having a second frequency;
    the first dither signal, the first rectangular wave signal having a first frequency which is greater than the second frequency;
    the first color first pull-up signal;
    a third electric field cancellation signal; and
    a first color second pull-up signal configured to drive the first color charged particles in the pixel expected to display the first color to move toward the side proximate to the display surface of the electronic ink screen.

2. The control method of the electronic ink screen according to claim 1, wherein the at least one pixel further includes second color charged particles and third color charged particles; the first color charged particles and the second color charged particles have like charges, the first color charged particles and the third color charged particles have opposite charges, and a mass of the first color charged particles is greater than a mass of the second color charged particles.

3. The control method of the electronic ink screen according to claim 2, further comprising:
outputting a second color driving signal to at least one pixel expected to display a second color in the electronic ink screen, wherein
the second color driving signal includes sub-signals in a plurality of periods; a sub-signal in the second color driving signal in a same period as the first dither signal is a third dither signal, and the third dither signal includes a third rectangular wave signal and a fourth electric field cancellation signal that are output in sequence.

4. The control method of the electronic ink screen according to claim 3, wherein the sub-signals in the plurality of periods included in the second color driving signal include sub-signals in seven periods, and the sub-signals in a first period to a seventh period included in the second color driving signal sequentially are:
a second color pull-down signal configured to drive the second color charged particles in the pixel expected to display the second color to move toward a side away from the display surface of the electronic ink screen;
a fourth dither signal including a fourth rectangular wave signal;
a fifth dither signal including a fifth rectangular wave signal having a fifth frequency;
the third dither signal, the third rectangular wave signal having a third frequency;
a fifth electric field cancellation signal;
a second color pull-up signal configured to drive the second color charged particles in the pixel expected to display the second color to move toward the side proximate to the display surface of the electronic ink screen; and
a sixth electric field cancellation signal; wherein the third frequency is greater than the fifth frequency.

5. The control method of the electronic ink screen according to claim 4, wherein
the third frequency is equal to the first frequency, and the fifth frequency is equal to the second frequency.

6. The control method of the electronic ink screen according to claim 2, further comprising:
outputting a third color driving signal to at least one pixel expected to display a third color in the electronic ink screen, wherein
the third color driving signal includes sub-signals in a plurality of periods; a sub-signal in the third color driving signal in a same period as the first dither signal is a sixth dither signal, and the sixth dither signal includes a sixth rectangular wave signal and a seventh electric field cancellation signal that are output in sequence.

7. The control method of the electronic ink screen according to claim 6, wherein the sub-signals in the plurality of periods included in the third color driving signal include sub-signals in seven periods, and the sub-signals in a first period to a seventh period included in the third color driving signal sequentially are:
a third color pull-down signal configured to drive the third color charged particles in the pixel expected to display the third color to move toward a side away from the display surface of the electronic ink screen;
a seventh dither signal including a seventh rectangular wave signal;
an eighth dither signal including an eighth rectangular wave signal having an eighth frequency;
the sixth dither signal, the sixth rectangular wave signal having a sixth frequency;
an eighth electric field cancellation signal;
a third color pull-up signal configured to drive the third color charged particles in the pixel expected to display the third color to move toward the side proximate to the display surface of the electronic ink screen; and
a ninth electric field cancellation signal; wherein
the sixth frequency is greater than the eighth frequency.

8. The control method of the electronic ink screen according to claim 7, wherein the sub-signals in the plurality of periods included in the first color driving signal includes sub-signals in seven periods, and the sub-signals in a first period to a seventh period included in the first color driving signal sequentially are:
a second electric field cancellation signal;
a first color pull-down signal configured to drive the first color charged particles in the pixel expected to display the first color to move toward a side away from the display surface of the electronic ink screen;
a second dither signal including a second rectangular wave signal having a second frequency;
the first dither signal, the first rectangular wave signal having a first frequency;
the first color first pull-up signal;
a third electric field cancellation signal; and
a first color second pull-up signal configured to drive the first color charged particles in the pixel expected to display the first color to move toward the side proximate to the display surface of the electronic ink screen; wherein the sixth frequency is equal to the first frequency, and the eighth frequency is equal to the second frequency.

9. The control method of the electronic ink screen according to claim 1, wherein the first rectangular wave signal includes a first level signal and a second level signal that are alternately output; and
a voltage value of the first constant voltage signal is substantially equal to one of a voltage value of the first level signal and a voltage value of the second level signal, or, a voltage value of the first constant voltage signal is between a voltage value of the first level signal and a voltage value of the second level signal.

10. The control method of the electronic ink screen according to claim 9, wherein the first color first pull-up signal includes a second constant voltage signal, and a voltage value of the second constant voltage signal is between the voltage value of the first level signal and the voltage value of the second level signal; and
the voltage value of the first constant voltage signal is between the voltage value of the first level signal and the voltage value of the second level signal, the voltage value of the first constant voltage signal is equal to the voltage value of the second constant voltage signal.

11. The control method of the electronic ink screen according to claim 1, wherein colors in an image to be displayed include a second color, a third color, and the first color, and the control method of the electronic ink screen further includes:

outputting a second color driving signal to at least one pixel expected to display the second color in the electronic ink screen; and
outputting a third color driving signal to at least one pixel expected to display the third color in the electronic ink screen; wherein
outputting the second color driving signal to the pixel expected to display the second color in the electronic ink screen, outputting the third color driving signal to the pixel expected to display the third color in the electronic ink screen, and outputting the first color driving signal to the pixel expected to display the first color in the electronic ink screen, includes:
sequentially scanning each row of pixels in the electronic ink screen in an I-th display driving period of displaying the image to be displayed;
outputting a sub-signal in the I-th period of the second color driving signal to the pixel expected to display the second color in each row of pixels scanned, outputting a sub-signal in the I-th period of the third color driving signal to the pixel expected to display the third color in each row of pixels scanned, and outputting a sub-signal in the I-th period of the first color driving signal to the pixel expected to display the first color in each row of pixels scanned; wherein I is greater than or equal to 1 (I≥1), and the second color driving signal, the third color driving signal and the first color driving signal include a same number of periods.

12. The control method of the electronic ink screen according to claim 1, wherein each pixel includes second color charged particles, third color charged particles, and the first color charged particles, and the control method of the electronic ink screen further includes:
outputting a second color driving signal to at least one pixel expected to display a second color in the electronic ink screen; and
outputting a third color driving signal to at least one pixel expected to display a third color in the electronic ink screen; wherein
outputting the second color driving signal to the pixel expected to display the second color in the electronic ink screen, outputting the third color driving signal to the pixel expected to display the third color in the electronic ink screen, and outputting the first color driving signal to the pixel expected to display the first color in the electronic ink screen, includes:
outputting the second color driving signal corresponding to a second color waveform file to the pixel expected to display the second color according to the stored second color waveform file;
outputting the third color driving signal corresponding to a third color waveform file to the pixel expected to display the third color according to the stored third color waveform file; and
outputting the first color driving signal corresponding to a first color waveform file to the pixel expected to display the first color according to the stored first color waveform file.

13. A non-transitory computer-readable storage medium having stored thereon computer program instructions that, when executed on an electronic ink display apparatus, cause the electronic ink display apparatus to perform the control method of the electronic ink screen according to claim 1.

14. A display control device, comprising:
a source driver; and
at least one processor configured to control the source driver to output a first color driving signal to at least one pixel expected to display a first color in an electronic ink screen; wherein
the first color driving signal includes sub-signals in a plurality of periods; the sub-signals in the plurality of periods include a first dither signal and a first color first pull-up signal in adjacent periods, and the first color first pull-up signal is in a period immediately after a period corresponding to the first dither signal;
the first dither signal includes: a first rectangular wave signal, a first electric field cancellation signal and a first constant voltage signal that are output in sequence; the first constant voltage signal is configured to drive first color charged particles in the pixel expected to display the first color to move toward a side proximate to a display surface of the electronic ink screen;
the first color first pull-up signal is configured to drive the first color charged particles in the pixel expected to display the first color to move toward the side proximate to the display surface of the electronic ink screen; and
the sub-signals in the plurality of periods included in the first color driving signal include sub-signals in seven periods, and the sub-signals in a first period to a seventh period included in the first color driving signal sequentially are:
a second electric field cancellation signal;
a first color pull-down signal configured to drive the first color charged particles in the pixel expected to display the first color to move toward a side away from the display surface of the electronic ink screen;
a second dither signal including a second rectangular wave signal having a second frequency;
the first dither signal, the first rectangular wave signal having a first frequency which is greater than the second frequency;
the first color first pull-up signal;
a third electric field cancellation signal; and
a first color second pull-up signal configured to drive the first color charged particles in the pixel expected to display the first color to move toward the side proximate to the display surface of the electronic ink screen.

15. The display control device according to claim 14, wherein the at least one processor is further configured to control the source driver to output a second color driving signal to at least one pixel expected to display a second color in the electronic ink screen; wherein
the second color driving signal includes sub-signals in a plurality of periods; a sub-signal in the second color driving signal in a same period as the first dither signal is a third dither signal, and the third dither signal includes a third rectangular wave and an electric field cancellation signal that are output in sequence.

16. The display control device according to claim 15, wherein the at least one processor is further configured to control the source driver to output a third color driving signal to at least one pixel expected to display a third color in the electronic ink screen; wherein
the third color driving signal includes sub-signals in a plurality of periods; a sub-signal in the third color driving signal in a same period as the first dither signal is a sixth dither signal, and the sixth dither signal includes a sixth rectangular wave signal and a seventh electric field cancellation signal that are output in sequence.

17. The display control device according to claim 16, further comprising:

a gate driver; wherein the at least one processor is configured to control the gate driver to sequentially scan each row of pixels in the electronic ink screen in an I-th display driving period of displaying an image to be displayed, and control the source driver to output a sub-signal in the I-th period of the second color driving signal to the pixel expected to display the second color in each row of pixels scanned, output a sub-signal in the I-th period of the third color driving signal to the pixel expected to display the third color in each row of pixels scanned, and output a sub-signal in the Ith -period of the first color driving signal to the pixel expected to display the first color in each row of pixels scanned; wherein I is greater than or equal to 1 (I≥1), and the second color driving signal, the third color driving signal and the first color driving signal include a same number of periods.

18. The display control device according to claim 14, further comprising:

at least one memory configured to store a second color waveform file, a third color waveform file, and a first color waveform file;

the at least one processor is further configured to control the source driver to output a second color driving signal corresponding to the second color waveform file to at least one pixel expected to display a second color according to the stored second color waveform file, output a third color driving signal corresponding to the third color waveform file to at least one pixel expected to display a third color according to the stored third color waveform file, and output the first color driving signal corresponding to the first color waveform file to the pixel expected to display the first color according to the stored first color waveform file.

19. An electronic ink display apparatus, comprising:

an electronic ink screen including a plurality of pixels, at least one pixel including first-color charged particles; and the display control device according to claim 14.

* * * * *